(12) United States Patent
Sheridon

(10) Patent No.: US 6,897,848 B2
(45) Date of Patent: May 24, 2005

(54) ROTATING ELEMENT SHEET MATERIAL AND STYLUS WITH GRADIENT FIELD ADDRESSING

(75) Inventor: Nicholas K. Sheridon, Los Altos, CA (US)

(73) Assignee: Xerox Corporation, Stamford, CT (US)

( * ) Notice: Subject to any disclaimer, the term of this patent is extended or adjusted under 35 U.S.C. 154(b) by 232 days.

(21) Appl. No.: 09/757,531

(22) Filed: Jan. 11, 2001

(65) Prior Publication Data

US 2002/0089490 A1 Jul. 11, 2002

(51) Int. Cl.$^7$ .................................................. G09G 3/34
(52) U.S. Cl. ............................ 345/107; 345/84; 345/173
(58) Field of Search .............................. 345/84, 85, 86, 345/107, 108, 109, 173–183; 359/296; 434/409

(56) References Cited

U.S. PATENT DOCUMENTS

| 2,326,634 A | 8/1943 | Gebhard et al. ............... 88/82 |
| 2,354,018 A | 7/1944 | Heltzer et al. ................. 88/82 |

(Continued)

FOREIGN PATENT DOCUMENTS

| GB | 1578460 | 11/1980 | ............. G09F/9/37 |
| WO | WO 98/03896 | 1/1998 | |
| WO | WO 98/41899 | 9/1998 | |
| WO | WO 99/10767 | 3/1999 | |

OTHER PUBLICATIONS

"Xerox PARC and 3M to collaborate on electronic paper," Information Today, vol. 16, No. 8, Sep. 1999.
Gibbs, "The Reinvention of Paper," Scientific American: Technology and Business, Sep. 1998.
Mattis, "Screen Saviors," Business 2.0, Jul. 1999.
Mann, "Who will own your next good idea?" The Atlantic Monthly, Sep. 1998, vol. 282, pp. 57–82.
Comiskey et al., "An electrophoretic ink for all–printed reflective electronic displays," Nature, Jul. 16, 1998, vol. 394, pp. 253–255.
Klein, "Will the future be written in E–Ink?" The Wall Street Journal, Jan. 4, 2000.

(Continued)

*Primary Examiner*—Regina Liang
*Assistant Examiner*—Jennifer T. Nguyen
(74) *Attorney, Agent, or Firm*—Finnegan, Henderson, Farabow, Garrett and Dunner, LLP.

(57) ABSTRACT

A kit comprising rotating element sheet material and a gradient field stylus, where the sheet material comprises a plurality of rotatable elements disposed in a substrate and in contact with an enabling fluid; where the substrate comprises a plurality of sheet latching components; where one of the rotatable elements comprises first and second rotatable latching components and a core configured to present a first aspect in a first orientation and a second aspect in a second orientation, related by a rotational transformation about an axis of the rotatable element; and where one of the sheet latching components is proximal to the first rotatable latching component in the first orientation and proximal to the second rotatable latching component in the second orientation; and where the rotatable and sheet latching components exhibit an attractive force based on a first gradient field; and where a distal end of the gradient field stylus exhibits an attractive force with the rotatable latching components based on a second gradient field.

15 Claims, 20 Drawing Sheets

U.S. PATENT DOCUMENTS

| | | | |
|---|---|---|---|
| 2,354,048 A | 7/1944 | Palmquist | 40/135 |
| 2,354,049 A | 7/1944 | Palmquist | 40/135 |
| 2,407,680 A | 9/1946 | Palmquist et al. | 88/82 |
| 2,600,963 A | 6/1952 | Bland | 49/58 |
| 2,684,788 A | 7/1954 | Bland | 222/177 |
| 2,794,301 A | 6/1957 | Law et al. | 49/84 |
| 2,950,985 A | 8/1960 | d'Adrian | 117/33 |
| 2,965,921 A | 12/1960 | Bland | 18/2.5 |
| 2,980,547 A | 4/1961 | d'Adrian | 106/47 |
| 3,034,177 A | 5/1962 | Hooper | 18/40 |
| 3,036,388 A | 5/1962 | Tate | 35/66 |
| 3,063,388 A | 11/1962 | Magarian et al. | 105/376 |
| RE25,363 E | 4/1963 | Tate | 35/66 |
| 3,150,947 A | 9/1964 | Bland | 65/21 |
| 3,222,204 A | 12/1965 | Weber et al. | 117/27 |
| 3,243,273 A | 3/1966 | Bland | 65/21 |
| 3,310,391 A | 3/1967 | Law | 65/21 |
| 3,406,363 A | 10/1968 | Tate | 335/302 |
| 3,594,065 A | 7/1971 | Marks | 350/160 |
| 3,615,993 A | 10/1971 | French | 156/155 |
| 3,617,333 A | 11/1971 | Brown | 117/35 |
| 3,648,281 A | 3/1972 | Dahms et al. | 340/373 |
| 3,670,323 A | 6/1972 | Sobel et al. | 340/324 |
| 3,795,435 A | 3/1974 | Schwab | 350/105 |
| 3,915,771 A | 10/1975 | Gatzke et al. | 156/71 |
| 3,982,334 A | 9/1976 | Tate | 35/66 |
| 4,001,140 A | 1/1977 | Foris et al. | 252/316 |
| 4,002,022 A | 1/1977 | Lopez C. | 58/126 |
| 4,082,426 A | 4/1978 | Brown | 350/105 |
| RE29,742 E | 8/1978 | Tung | 2/412 |
| 4,117,192 A | 9/1978 | Jorgensen | 428/337 |
| 4,117,194 A | 9/1978 | Barbe et al. | 428/374 |
| 4,126,854 A | 11/1978 | Sheridon | 340/373 |
| 4,143,103 A | 3/1979 | Sheridon | 264/4 |
| 4,143,472 A | 3/1979 | Murata et al. | 35/66 |
| 4,229,732 A | 10/1980 | Hartstein et al. | 340/378.2 |
| 4,232,084 A | 11/1980 | Tate | 428/309 |
| 4,253,909 A | 3/1981 | Lee | 156/654 |
| 4,256,677 A | 3/1981 | Lee | 264/8 |
| 4,261,653 A | 4/1981 | Goodrich | 350/362 |
| 4,267,946 A | 5/1981 | Thatcher | 222/345 |
| 4,268,413 A | 5/1981 | Dabisch | 252/408 |
| 4,273,672 A | 6/1981 | Vassiliades | 252/316 |
| 4,283,438 A | 8/1981 | Lee | 427/47 |
| 4,288,788 A | 9/1981 | Rogers et al. | 340/378.2 |
| 4,299,880 A | 11/1981 | Arens | 428/304 |
| 4,367,920 A | 1/1983 | Tung et al. | 350/105 |
| 4,368,952 A | 1/1983 | Murata et al. | 350/362 |
| 4,374,889 A | 2/1983 | Arens | 428/207 |
| 4,381,616 A | 5/1983 | Saxer | 40/502 |
| 4,402,062 A | 8/1983 | Batchelder | 365/153 |
| 4,411,973 A | 10/1983 | Gilmour et al. | 430/7 |
| 4,417,543 A | 11/1983 | Lee | 118/620 |
| 4,418,098 A | 11/1983 | Maistrovich | 427/161 |
| 4,418,346 A | 11/1983 | Batchelder | 340/787 |
| 4,419,383 A | 12/1983 | Lee | 427/47 |
| 4,438,160 A | 3/1984 | Ishikawa et al. | 427/214 |
| 4,441,791 A | 4/1984 | Hornbeck | 350/360 |
| 4,457,723 A | 7/1984 | Tate | 434/409 |
| 4,492,435 A | 1/1985 | Banton et al. | 350/360 |
| 4,500,172 A | 2/1985 | Gagnon et al. | 350/331 R |
| 4,511,210 A | 4/1985 | Tung et al. | 350/105 |
| 4,532,608 A | 7/1985 | Wu | 365/127 |
| 4,569,857 A | 2/1986 | Tung et al. | 427/163 |
| 4,592,628 A | 6/1986 | Altman et al. | 350/486 |
| 4,627,689 A | 12/1986 | Asher | 350/362 |
| 4,632,517 A | 12/1986 | Asher | 350/362 |
| 4,657,349 A | 4/1987 | Labes et al. | 350/362 |
| 4,675,476 A | 6/1987 | Kobayashi | 178/18 |
| 4,678,695 A | 7/1987 | Tung et al. | 428/120 |
| 4,688,900 A | 8/1987 | Doane et al. | 350/347 |
| 4,695,528 A | 9/1987 | Dabisch et al. | 430/290 |
| 4,701,024 A | * 10/1987 | Kobayashi et al. | 350/331 |
| 4,710,732 A | 12/1987 | Hornbeck | 332/7.51 |
| 4,713,295 A | 12/1987 | Laroche | 428/406 |
| 4,721,649 A | 1/1988 | Belisle et al. | 428/325 |
| 4,725,494 A | 2/1988 | Belisle et al. | 428/325 |
| 4,729,687 A | 3/1988 | Arens | 401/198 |
| 4,740,266 A | 4/1988 | Wu | 156/633 |
| 4,781,789 A | 11/1988 | Wu | 156/633 |
| 4,781,790 A | 11/1988 | Wu | 156/633 |
| 4,783,236 A | 11/1988 | Wu | 156/633 |
| 4,795,243 A | 1/1989 | Suzuki | 350/362 |
| 4,795,528 A | 1/1989 | Wu | 156/633 |
| 4,810,431 A | 3/1989 | Leidner | 264/15 |
| 4,837,071 A | 6/1989 | Tagoku et al. | 428/195 |
| 4,877,253 A | 10/1989 | Arens | 273/240 |
| 4,890,902 A | 1/1990 | Doane et al. | 350/347 |
| 4,919,521 A | 4/1990 | Tada et al. | 350/362 |
| 4,931,019 A | 6/1990 | Park | 434/409 |
| 4,948,232 A | 8/1990 | Lange | 350/334 |
| 4,956,619 A | 9/1990 | Hornbeck | 330/4.3 |
| 4,991,941 A | 2/1991 | Kalmanash | 350/347 |
| 4,994,204 A | 2/1991 | Doane et al. | 252/299.01 |
| 5,006,422 A | * 4/1991 | Sakurai et al. | 428/694 |
| 5,039,557 A | 8/1991 | White | 427/137 |
| 5,066,559 A | 11/1991 | Elmasry et al. | 430/111 |
| 5,075,186 A | 12/1991 | Sheridon | 430/47 |
| 5,128,203 A | 7/1992 | LaRoche | 428/325 |
| 5,131,736 A | 7/1992 | Alvarez | 359/886 |
| 5,151,032 A | 9/1992 | Igawa | 434/409 |
| 5,155,607 A | 10/1992 | Inoue et al. | 359/51 |
| 5,157,011 A | * 10/1992 | Okabe et al. | 503/201 |
| 5,189,658 A | 2/1993 | Moses | 369/100 |
| 5,219,820 A | 6/1993 | Morohoshi et al. | 503/204 |
| 5,223,473 A | 6/1993 | Oliver et al. | 503/226 |
| 5,226,099 A | 7/1993 | Mignardi et al. | 385/19 |
| 5,233,459 A | 8/1993 | Bozler et al. | 359/230 |
| 5,249,000 A | 9/1993 | Okabe et al. | 346/151 |
| 5,251,048 A | 10/1993 | Doane et al. | 359/51 |
| 5,262,098 A | 11/1993 | Crowley et al. | 264/8 |
| 5,262,374 A | 11/1993 | Okabe et al. | 503/201 |
| 5,270,872 A | 12/1993 | Spry | 359/885 |
| 5,274,460 A | 12/1993 | Yamada et al. | 358/296 |
| 5,290,066 A | 3/1994 | Mody | 281/15.1 |
| 5,315,418 A | 5/1994 | Sprague et al. | 359/41 |
| 5,315,776 A | 5/1994 | Strawbridge et al. | 40/505 |
| 5,331,454 A | 7/1994 | Hornbeck | 359/224 |
| 5,344,594 A | 9/1994 | Sheridon | 264/4.1 |
| 5,351,995 A | 10/1994 | Booker | 283/117 |
| 5,354,598 A | 10/1994 | Arens | 428/195 |
| 5,363,222 A | 11/1994 | Ledebuhr | 359/40 |
| 5,383,008 A | 1/1995 | Sheridon | 355/256 |
| 5,384,067 A | 1/1995 | Doane et al. | 252/299.01 |
| 5,389,426 A | 2/1995 | Arens et al. | 428/195 |
| 5,389,945 A | 2/1995 | Sheridon | 345/85 |
| 5,392,151 A | 2/1995 | Nelson | 359/223 |
| 5,397,503 A | 3/1995 | Yuasa et al. | 252/299.01 |
| 5,411,398 A | * 5/1995 | Nakanishi et al. | 434/409 |
| 5,416,996 A | 5/1995 | Clemens et al. | 40/502 |
| 5,432,526 A | 7/1995 | Hyatt | 345/87 |
| 5,432,534 A | 7/1995 | Maruyama et al. | 347/172 |
| 5,459,602 A | 10/1995 | Sampsell | 359/234 |
| 5,469,020 A | 11/1995 | Herrick | 313/511 |
| 5,475,401 A | 12/1995 | Verrier et al. | 345/179 |
| 5,515,075 A | 5/1996 | Nakagiri et al. | 345/111 |
| 5,526,016 A | 6/1996 | Nakagiri et al. | 345/111 |
| 5,535,047 A | 7/1996 | Hornbeck | 359/295 |
| 5,582,700 A | 12/1996 | Bryning et al. | 204/450 |
| 5,604,027 A | 2/1997 | Sheridon | 428/323 |
| 5,627,562 A | 5/1997 | Skodlar | 345/111 |

| | | | | | | |
|---|---|---|---|---|---|---|
| 5,659,330 A | 8/1997 | Sheridon ............... 345/84 | | 6,130,773 A | 10/2000 | Jacobson et al. ........... 359/296 |
| 5,667,924 A | 9/1997 | Ziolo ..................... 430/39 | | 6,137,467 A | 10/2000 | Sheridon et al. ............ 345/107 |
| 5,703,671 A | 12/1997 | Narita et al. ............. 355/32 | | 6,147,791 A * | 11/2000 | Sheridon ................... 359/296 |
| 5,708,525 A | 1/1998 | Sheridon ............... 359/296 | | 6,162,321 A | 12/2000 | Silverman .................. 156/276 |
| 5,717,283 A | 2/1998 | Biegelsen et al. ......... 313/483 | | 6,174,153 B1 | 1/2001 | Sheridon ........................ 425/3 |
| 5,717,514 A | 2/1998 | Sheridon ............... 359/296 | | RE37,085 E | 3/2001 | Sheridon ................... 428/323 |
| 5,717,515 A | 2/1998 | Sheridon ............... 359/296 | | 6,196,848 B1 * | 3/2001 | Yamazaki .................. 434/409 |
| 5,723,204 A | 3/1998 | Stefik ..................... 428/206 | | 6,197,228 B1 | 3/2001 | Sheridon ................... 264/1.36 |
| 5,724,064 A | 3/1998 | Stefik et al. .............. 345/105 | | 6,211,998 B1 | 4/2001 | Sheridon ................... 359/296 |
| 5,731,792 A | 3/1998 | Sheridon ............... 345/84 | | 6,222,513 B1 * | 4/2001 | Howard et al. .............. 345/84 |
| 5,737,115 A | 4/1998 | Mackinlay et al. ......... 359/296 | | 6,243,058 B1 | 6/2001 | Mikkelsen et al. ........... 345/84 |
| 5,739,801 A | 4/1998 | Sheridon ............... 345/84 | | 6,251,329 B1 | 6/2001 | Sheridon ................... 264/427 |
| 5,739,946 A | 4/1998 | Iwanaga et al. ............ 359/296 | | 6,383,619 B1 | 5/2002 | Engler et al. .............. 428/212 |
| 5,751,268 A | 5/1998 | Sheridon ............... 345/107 | | 6,396,621 B1 | 5/2002 | Sheridon ................... 359/296 |
| 5,754,332 A | 5/1998 | Crowley .................. 359/296 | | 6,421,035 B1 | 7/2002 | Sheridon et al. ............. 345/85 |
| 5,757,345 A | 5/1998 | Sheridon ............... 345/84 | | 6,428,868 B1 | 8/2002 | Sheridon et al. ........... 428/40.2 |
| 5,760,761 A | 6/1998 | Sheridon ............... 345/107 | | 6,441,946 B1 | 8/2002 | Sheridon ................... 359/296 |
| 5,767,826 A | 6/1998 | Sheridon et al. .......... 345/84 | | 6,473,072 B1 * | 10/2002 | Comiskey ................... 345/173 |
| 5,777,782 A | 7/1998 | Sheridon ............... 359/296 | | 6,480,322 B2 | 11/2002 | Engler et al. ............... 359/296 |
| 5,784,189 A | 7/1998 | Bozler et al. ............. 359/254 | | 6,485,280 B1 | 11/2002 | Richley .......................... 425/8 |
| 5,808,593 A | 9/1998 | Sheridon ............... 345/84 | | 6,487,002 B1 | 11/2002 | Biegelsen .................. 359/296 |
| 5,808,783 A | 9/1998 | Crowley .................. 359/296 | | 6,518,948 B1 | 2/2003 | Berstis ........................ 345/107 |
| 5,815,306 A | 9/1998 | Sheridon et al. .......... 359/296 | | 6,521,145 B1 | 2/2003 | Engler et al. ............... 264/1.9 |
| 5,821,624 A | 10/1998 | Pasch ...................... 257/776 | | 6,524,500 B2 | 2/2003 | Sheridon et al. ............ 264/1.7 |
| 5,825,529 A | 10/1998 | Crowley .................. 359/296 | | 6,531,997 B1 | 3/2003 | Gates et al. ................ 345/107 |
| 5,828,441 A | 10/1998 | Narita et al. ............. 355/32 | | 6,549,327 B2 | 4/2003 | Foucher et al. ............. 359/296 |
| 5,866,284 A | 2/1999 | Vincent ..................... 430/37 | | 6,556,470 B1 | 4/2003 | Vincent et al. ............. 365/151 |
| 5,869,929 A | 2/1999 | Eida et al. ................. 313/501 | | 6,559,820 B1 | 5/2003 | Mikkelsen, Jr. et al. ...... 345/84 |
| 5,877,844 A | 3/1999 | Matsumoto ................ 355/35 | | 6,570,700 B2 | 5/2003 | Engler et al. ............... 359/296 |
| 5,891,479 A | 4/1999 | Sheridon ..................... 425/8 | | 6,573,880 B1 | 6/2003 | Simoni et al. ............... 345/87 |
| 5,892,497 A | 4/1999 | Robertson ................. 345/107 | | 6,577,432 B2 | 6/2003 | Engler et al. ............... 359/296 |
| 5,893,206 A | 4/1999 | Furlani et al. .............. 29/608 | | 6,588,131 B2 | 7/2003 | O'Connell, Jr. .............. 40/446 |
| 5,894,367 A | 4/1999 | Sheridon ............... 359/296 | | 2002/0084539 A1 | 7/2002 | Sheridon et al. ................ 264/4 |
| 5,900,192 A | 5/1999 | Richley ..................... 264/8 | | 2002/0089475 A1 | 7/2002 | Sheridon ...................... 345/84 |
| 5,900,858 A | 5/1999 | Richley .................... 345/107 | | 2002/0089486 A1 | 7/2002 | Sheridon .................... 345/107 |
| 5,904,790 A | 5/1999 | Sheridon ................... 156/83 | | 2002/0130831 A1 | 9/2002 | Engler et al. ............... 345/107 |
| 5,906,743 A | 5/1999 | Cohen et al. ............ 210/502.1 | | 2002/0131148 A1 | 9/2002 | Engler et al. ............... 359/296 |
| 5,914,805 A | 6/1999 | Crowley .................. 359/296 | | 2002/0131149 A1 | 9/2002 | Engler et al. ............... 359/296 |
| 5,917,646 A | 6/1999 | Sheridon ............... 359/296 | | 2002/0131150 A1 | 9/2002 | Engler et al. ............... 359/296 |
| 5,919,409 A | 7/1999 | Sheridon ..................... 264/8 | | 2002/0131151 A1 | 9/2002 | Engler et al. ............... 359/296 |
| 5,922,268 A | 7/1999 | Sheridon .................. 264/437 | | 2002/0186197 A1 | 12/2002 | Biegelsen .................. 345/107 |
| 5,930,026 A | 7/1999 | Jacobson et al. .......... 359/296 | | 2002/0186450 A1 | 12/2002 | Foucher et al. ............. 359/296 |
| 5,940,054 A | 8/1999 | Harris ....................... 345/85 | | 2002/0186452 A1 | 12/2002 | Biegelsen .................. 359/296 |
| 5,956,005 A | 9/1999 | Sheridon ............... 345/84 | | 2003/0046838 A1 | 3/2003 | O'Connell, Jr. .............. 40/452 |
| 5,961,804 A | 10/1999 | Jacobson et al. .......... 204/606 | | | | |
| 5,969,472 A | 10/1999 | Kisner ...................... 313/484 | | | | |
| 5,972,493 A * | 10/1999 | Iwasaki et al. ............ 428/323 | | | | |
| 5,974,901 A | 11/1999 | Zborowski et al. ........ 73/865.5 | | | | |
| 5,975,680 A | 11/1999 | Wen et al. .................. 347/43 | | | | |
| 5,976,428 A | 11/1999 | Richley .................... 264/10 | | | | |
| 5,982,346 A | 11/1999 | Sheridon et al. ............. 345/85 | | | | |
| 5,986,629 A | 11/1999 | Smith et al. ................. 345/84 | | | | |
| 5,989,629 A | 11/1999 | Sacripante et al. ......... 427/180 | | | | |
| 6,014,116 A | 1/2000 | Haynes et al. ................. 345/1 | | | | |
| 6,014,247 A | 1/2000 | Winter et al. .............. 359/296 | | | | |
| 6,017,584 A | 1/2000 | Albert et al. ........... 3427/213.3 | | | | |
| 6,034,807 A | 3/2000 | Little et al. ................ 359/227 | | | | |
| 6,038,059 A | 3/2000 | Silverman .................. 359/296 | | | | |
| 6,054,071 A | 4/2000 | Mikkelsen, Jr. ........... 264/1.36 | | | | |
| 6,054,809 A | 4/2000 | Haynes et al. ............. 313/505 | | | | |
| 6,055,091 A | 4/2000 | Sheridon et al. ........... 359/296 | | | | |
| 6,067,185 A | 5/2000 | Albert et al. ............... 359/296 | | | | |
| 6,072,621 A | 6/2000 | Kishi et al. ................ 359/296 | | | | |
| 6,097,531 A | 8/2000 | Sheridon ................... 359/296 | | | | |
| 6,110,538 A | 8/2000 | Sheridon ................... 427/457 | | | | |
| 6,118,419 A | 9/2000 | Smith et al. ................. 345/84 | | | | |
| 6,120,588 A | 9/2000 | Jacobson ................ 106/31.16 | | | | |
| 6,120,839 A | 9/2000 | Comiskey et al. ....... 427/213.3 | | | | |
| 6,122,094 A | 9/2000 | Silverman .................. 359/296 | | | | |
| 6,128,124 A | 10/2000 | Silverman .................. 359/296 | | | | |

OTHER PUBLICATIONS

Wisnieff, "Printing Screens," Nature, Jul. 16, 1998, vol. 394, Issue No. 6690, pp. 225 and 227.

L.L. Lee, "A Magnetic–Particles Display," IEEE Transactions on Electron Devices, vol. ED–22, No. 9, Sep. 1975, pp. 758–765.

L.L. Lee, "Fabrication of Magnetic Particles Displays," Proceeding of the S.I.D., vol. 18/3 & 4 1977, pp. 283–288.

Ser. No. 09/200,553, Appln. by Sheridon.

Ser. No. 09/199,544, Appln. by Sheridon.

Ser. No. 09/465,801, Appln. by Biegelsen et al.

Ser. No. 09/563,504, Appln. by Knights.

Ser. No. 09/643,640, Appln. by Kazmaier et al.

Ser. No. 09/549,518, Appln. by Sheridon.

Ser. No. 09/517,522, Appln. by Silverman.

Comiskey et al., "Electrophoretic Ink: A printable Display Material," SID 97 Digest, pp. 75–76 (1997).

I. Ota, et al., IEEE Conference on Display Devices, 72 CH 0707–0–ED 1972, pp. 46–49.

EPO Search Report, Application No. EP 02 25 0115 (Dec. 3, 2003) (3 pages).

* cited by examiner

ROTATING ELEMENT SHEET MATERIAL AND STYLUS WITH GRADIENT FIELD ADDRESSING

RELATED APPLICATIONS

The following identified United States patent applications are relied upon and are fully incorporated herein by reference:

U.S. patent application entitled "Rotating element sheet material with dual vector field addressing," by Nicholas K. Sheridon, filed on Jan. 11, 2001, and accorded Ser. No. 09/757,539.

U.S. patent application entitled "Fringe-field filter for addressable displays," by Nicholas K. Sheridon, filed on Jan. 11, 2001, and accorded Ser. No. 09/757,538.

INCORPORATION BY REFERENCE

The following U.S. patents are herein fully incorporated by reference:

U.S. Pat. No. 4,126,854 by Sheridon entitled "Twisting Ball Panel Display;"

U.S. Pat. No. 4,143,103 by Sheridon entitled "Method Of Making A Twisting Ball Panel Display;"

U.S. Pat. No. 5,262,098 by Crowley et al. entitled "Method And Apparatus For Fabricating Bichromal Balls For A Twisting Ball Display;"

U.S. Pat. No. 5,344,594, by Sheridon entitled "Method For The Fabrication Of Multicolored Balls For A Twisting Ball Display;"

U.S. Pat. No. 5,389,945, by Sheridon entitled "Writing System Including PaperLike Digitally Addressed Media and Addressing Device Therefor;"

U.S. Pat. No. 5,604,027 by Sheridon entitled "Some Uses Of Microencapsulation For Electric Paper;"

U.S. Pat. No. 5,717,514 by Sheridon entitled "Polychromal Segmented Balls For A Twisting Ball Display;"

U.S. Pat. No. 5,767,826 by Sheridon et al. entitled "Subtractive Color Twisting Ball Display;"

U.S. Pat. No. 5,777,782 by Sheridon entitled "Auxiliary Optics For A Twisting Ball Display;"

U.S. Pat. No. 5,894,367 by Sheridon entitled "Twisting Cylinder Display Using Multiple Chromatic Values;"

U.S. Pat. No. 6,055,091 by Sheridon et al. entitled "Twisting Cylinder Display;"

U.S. Pat. No. 6,097,531 by Sheridon entitled "Method Of Making Uniformly Magnetized Elements For A Gyricon Display;"

U.S. Pat. No. 6,110,538 by Sheridon entitled "A Method Of Making A Gyricon Display Using Magnetic Latching;"

U.S. patent application Ser. No. 08/960,865 by Sheridon et al. entitled "Twisting Cylinder Display;"

U.S. Pat. No. 6,222,513 by Howard et al. entitled "Charge Retention Islands for Electric Paper And Applications Thereof"

U.S. patent application Ser. No. 09/199,544 by Sheridon entitled "Gyricon Displays Utilizing Rotating Elements And Magnetic Latching;"

U.S. patent application Ser. No. 09/200,553 by Sheridon entitled "Gyricon Displays Utilizing Magnetic Elements And Magnetic Trapping;"

U.S. Pat. No. 6,174,153 by Sheridon entitled "An Apparatus For Making Uniformly Magnetized Elements For A Gyricon Display;"

U.S. Pat. No. 6,251,329 by Sheridon entitled "A Method Of Making A Gyricon Display Using Magnetic Latching;"

U.S. Pat. No. 6,197,228 by Sheridon entitled "A Method Of Making A Gyricon Display Using Magnetic Latching;"

U.S. Pat. No. 6,211,998 by Sheridon entitled "Magnetic Unlatching And Addressing Of A Gyricon Display;"

U.S. patent application Ser. No. 09/465,801 by Biegelsen et al. entitled "System and method for rotatable element assembly and laminate substrate assembly;"

U.S. patent application Ser. No. 09/563,504 by Knights entitled "Rotating element sheet material with microstructured substrate and method of use;"

U.S. patent application Ser. No. 09/549,518 by Sheridon entitled "Rotating element sheet material with generalized containment structure;"

U.S. patent application Ser. No. 09/517,522 by Silverman entitled "Rotating element sheet material with reversible highlighting;" and U.S. patent application Ser. No. 09/643,670 by Kazmaier et al. entitled "Electromagnetophoretic display system and method."

I. FIELD OF THE INVENTION

The present invention relates to the use of rotating element sheet material with a stylus for multiaspect addressing. More particularly, the present invention relates to the use of a stylus for introducing a magnetic field to rotating element sheet material so as to produce a discrete aspect change in the rotating element sheet material.

II. BACKGROUND OF THE INVENTION

Rotating element sheet material has been disclosed in U.S. Pat. No. 4,126,854 and 4,143,103, both hereinabove incorporated by reference, and generally comprises a substrate, an enabling fluid, and a class of rotatable elements. As discussed more below, rotating element sheet material has found a use as "reusable electric paper." FIGS. 1 and 2 depict an enlarged section of rotating element sheet material 50, including rotatable element 10, enabling fluid 20, cavity 30, and substrate 40. Observer 60 is also shown. Although FIG. 2 depicts a cylindrically shaped rotatable element and cavity, many other shapes will work and are consistent with the present invention. As disclosed in U.S. Pat. No. 5,389,945, herein incorporated by reference, the thickness of substrate 40 may be of the order of hundreds of microns, and the dimensions of rotatable element 10 and cavity 30 may be of the order of 10 to 100 microns.

In FIGS. 1 and 2, substrate 40 is an elastomer material, such as silicone rubber, that accommodates both enabling fluid 20 and the class of rotatable elements within a cavity or cavities disposed throughout substrate 40. The cavity or cavities contain both enabling fluid 20 and the class of rotatable elements such that rotatable element 10 is in contact with enabling fluid 20 and at least one translational degree of freedom of rotatable element 10 is restricted. The contact between enabling fluid 20 and rotatable element 10 breaks a symmetry of rotatable element 10 and allows rotatable element 10 to be addressed. The state of broken symmetry of rotatable element 10, or addressing polarity, can be the establishment of an electric dipole about an axis of rotation. For example, it is well known that small particles in a dielectric liquid acquire an electrical charge that is related to the Zeta potential of the surface coating. Thus, an electric dipole can be established on a rotatable element in a dielectric liquid by the suitable choice of coatings applied to opposing surfaces of the rotatable element about an axis of rotation.

The use of rotating element sheet material as "reusable electric paper" is due to that fact that the rotatable elements are typically given a second broken symmetry, a multivalued aspect, correlated with the addressing polarity discussed above. That is, the above-mentioned coatings may be chosen so as to respond to incident electromagnetic energy in distinguishable ways, as indicated in FIG. 2, for example. Thus, an applied vector field can control the aspect of rotatable element 10 to favorably situated observer 60.

For example, as disclosed in U.S. Pat. No. 4,126,854, hereinabove incorporated by reference, rotatable element 10 may comprise a black polyethylene generally spherical body with titanium oxide sputtered on one hemisphere, where the titanium oxide provides a light-colored aspect in one orientation. Such a rotatable element in a transparent dielectric liquid will exhibit the desired addressing polarity as well as the desired aspect.

II.A. Rotatable Elements with Two-valued Aspects

A multivalued aspect in its simplest form is a two-valued aspect. When the aspect is the chromatic response to visible light, a rotatable element with a two-valued aspect can be referred to as a bichromal rotatable element. Such a rotatable element may be fabricated by the union of two layers of material as described in U.S. Pat. Nos. 5,262,098 and 6,147,791, herein incorporated by reference.

FIGS. 3–6 depict rotatable element 10 with a two-valued aspect and an exemplary system that use such rotatable elements from the prior art. In FIG. 3, rotatable element 10 is composed of first layer 70 and second layer 80 and is, by way of example again, a generally cylindrical body. The surface of first layer 70 has first coating 75 at a first Zeta potential, and the surface of second layer 80 has second coating 85 at a second Zeta potential. First coating 75 and second coating 85 are chosen such that, when in contact with a dielectric fluid (not shown), first coating 75 has a net negative electric charge with respect to second coating 85. This is depicted in FIG. 3 by the "−" and "+" symbols respectively. Furthermore, the combination of first coating 75 and the surface of first layer 70 is white-colored, and the combination of second coating 85 and the surface of second layer 80 is non-white-colored, indicated in FIG. 3 by hatching. One skilled in the art should appreciate that the material associated with first layer 70 and first coating 75 may be the same. Likewise, the material associated with second layer 80 and second coating 85 may be the same.

FIG. 4 depicts no-field set 110. No-field set 110 is a subset of randomly oriented rotatable elements in the vicinity of vector field 100 when vector field 100 has zero magnitude. Vector field 100 is an electric field. No-field set 110, thus, contains rotatable elements with arbitrary orientations with respect to each other. Therefore, observer 60 in the case of no-field set 110 registers views of the combination of second coating 85 and the surface of second layer 80, and first coating 75 and the surface of first layer 70 (as depicted in FIG. 3) in an unordered sequence. Infralayer 55 forms the backdrop of the resulting view. Infralayer 55 can consist of any type of material, including but not limited to other rotatable elements, or some material that presents a given aspect to observer 60.

FIGS. 5 and 6 depict first aspect set 120. First aspect set 120 is a subset of rotatable elements in the vicinity of vector field 100 when the magnitude of vector field 100 is nonzero and has the orientation indicated by arrow 105. In first aspect set 120, all of the rotatable elements orient themselves with respect to arrow 105 due to the electrostatic dipole present on each rotatable element 10. In contrast to no-field set 110, observer 60 in the case of first aspect set 120 registers a view of a set of rotatable elements ordered with the non-white-colored side up (the combination of second coating 85 and the surface of second layer 80 as depicted in FIG. 3). Again, infralayer 55 forms the backdrop of the resulting view. In FIGS. 5 and 6, rotatable element 10, under the influence of applied vector field 100, orients itself with respect to vector field 100 due to the electric charges present as a result of first coating 75 and second coating 85. FIG. 5 is a side view indicating the relative positions of observer 60, first aspect set 120, and infralayer 55. FIG. 6 is an alternate view of first aspect set 120 from a top perspective. In FIG. 6, the symbol ⊙ indicates an arrow directed out of the plane of the figure.

One skilled in the art should appreciate that first aspect set 120 will maintain its aspect after applied vector field 100 is removed, in part due to the energy associated with the attraction between rotatable element 10 and the substrate structure, as, for example, cavity walls (not shown). This energy contributes, in part, to the switching characteristics and the memory capability of rotating element sheet material 50, as disclosed in U.S. Pat. No. 4,126,854, hereinabove incorporated by reference, and discussed in more detail below.

Further still, one skilled in the art should appreciate that no-field set and first aspect set discussed above in FIGS. 4–6 can form the elements of a pixel, where vector field 100 can be manipulated on a pixel by pixel basis using an addressing scheme as discussed, for example, in U.S. Pat. No. 5,717,515, herein incorporated by reference.

For example, U.S. Pat. No. 4,126,854 entitled "Twisting Ball Panel Display" issued Nov. 21, 1978, and U.S. Pat. No. 4,143,103 entitled "Method Of Making A Twisting Ball Display," issued Mar. 6, 1979, both by Sheridon, describe a rotating element sheet material that comprises bichromal rotatable elements contained in fluid-filled cavities and embedded in an elastomer medium. One segment of the bichromal rotatable elements has a larger electrical charge in contact with the fluid and in the presence of the electrical field than the other segment. Thus, for a given polarity of applied electrical field, one segment will rotate toward and be visible to an observer of the display. Applying the opposite polarity of electrical field will cause the rotatable element to rotate and present the other segment to be seen by the observer.

U.S. Pat. No. 4,143,103 describes the response of the bichromal rotatable element to the applied electrical field as a threshold response. That is, as the external field is increased, the bichromal rotatable element remains stationary in position until a threshold voltage is reached, at which time the rotatable element starts to rotate from its initial position. The amount of rotation increases with an increasing electrical field until a 180-degree rotation can be achieved. The value of the external field that causes a 180-degree rotation is called the full addressing voltage.

The response pattern of the bichromal rotatable element to an external electrical field determines the type of addressing that may be used to create images on the rotating element sheet material. There are known in the art three types of addressing schemes for displays. The first of these is active matrix addressing, which places the least demands on the properties of the display.

In active matrix addressing a separate addressing electrode is provided for each pixel of the display and each of these electrodes is continuously supplied with an addressing voltage. The complete set of voltages can be changed for each addressing frame. While this type of addressing places the least demands on the properties of the display medium, active matrix addressing is the most expensive, most complicated and least energy efficient type of addressing.

The second type of addressing scheme is passive matrix addressing. Passive matrix addressing makes use of two sets of electrodes, one on each side of the display medium. Typically, one of these consists of horizontal conductive lines and the other consists of vertical conductive lines. The conductive lines on the front surface or window of the display are necessarily aspect-transparent. To address the display medium a voltage is placed on a horizontal conductive line and a voltage is placed on a vertical conductive line. The segment of medium located at the intersection of these two lines experiences a voltage equal to the sum of these two voltages. If the voltages are equal, as they usually are, the sections of medium located adjacent to the each of the lines, but not at the intersection of the lines, experience ½ the voltage experienced by the section of medium at the line intersection. Passive addressing is less complicated and more energy efficient because the pixels of the display medium are addressed only for as long as is required to change their optical states. However, the requirements for a medium that can be addressed with a passive matrix display are significantly greater than for the active matrix case. The medium must respond fully to the full addressing voltage but it must not respond to ½ the full addressing voltage. This is called a threshold response behavior. The medium must also stay in whichever optical state it has been switched into by the addressing electrodes without the continuous application of voltage—that is, it should store the image without power. Passive addressing is the most widely used method of addressing displays and is the lowest cost.

The third type of addressing consists of a linear array of addressing electrodes in the form of a bar that can be moved over the surface of the sheet material. In this form of addressing, the sheet material is placed over or incorporates a grounding electrode and is protected from possible mechanical damage from the moving bar by placing a thin window between the bar and the rotating element sheet material. As the bar is moved over the sheet material, it applies voltages to specific pixels of the sheet material for short periods of time and generates a full image each time the bar is scanned over the surface. In one variation of this method, the addressing bar deposits image-wise charge on the surface of the window.

The requirements imposed on the sheet material by this form of addressing then depend on which type of addressing bar is used. If the addressing bar simply exposes the sheet material to voltages as it passes over the surface, then it is necessary for the rotating sheet material to exhibit threshold behavior. Thus the area of the sheet material directly under the addressing bar electrode must undergo a change in aspect when exposed to the full addressing voltage; but as the bar moves to the next row of pixels, this same area of sheet material must not respond to the diminished voltages experienced by the sheet material from the moving addressing bar. As in passive addressing, this requires that the sheet material have a sharp threshold response. This addressing bar also requires that the change in aspect occur completely during the time the addressing bar electrodes move over its vicinity, which usually limits the display frame addressing speed. U.S. patent application Ser. No. 09/037,767 by Howard et al. entitled "Charge Retention Islands For Electric Paper And Applications Thereof" and also assigned to the same assignee as this application, describes an arrangement of addressing electrodes that greatly reduces the switching speed requirements of the medium due to this effect.

In U.S. patent application Ser. No. 09/037,767 the addressing bar deposits image-wise charge on or near the surface of the sheet material. The charge deposition addressing method relaxes the requirements on the sheet material. The addressing bar speed over the surface is limited only by the rate at which it can deposit image-wise charge, because the sheet material can respond to the voltage associated with the deposited charge pattern at its own speed. Threshold response behavior is not so important; however, the ability to store the image is because it can be expected that the image-wise charge deposited on the sheet material will leak off over a short period of time. However, addressing bars that can deposit image-wise charge on or near the sheet material tend to be bulky and more expensive than bars that simply impose image-wise voltages directly.

II.B. Rotatable Elements with Multivalued Aspect

A rotatable element with multivalued aspect may be generally fabricated as disclosed in U.S. Pat. No. 5,894,367, hereinabove incorporated by reference. An exemplary rotatable element 10 with multivalued aspect of the prior art is depicted in FIG. 7. Rotatable element 10 in FIGS. 7 and 8 is composed of core 140 within aspect-transparent cladding 137. Core 140 in FIGS. 7 and 8 is prism-shaped and is depicted as a square column. As used herein, the term "prism-shaped" refers to a polyhedron whose ends have substantially the same size and shape and are substantially parallel, and whose remaining sides are each substantially parallelograms. Depending upon the orientation of rotatable element 10 about an axis of rotation through core 140, rotatable element 10 may present first aspect surface 142, second aspect surface 144, third aspect surface 146, or fourth aspect surface 148 to a favorably situated observer. In FIG. 7, first aspect surface 142 and second aspect surface 144 are depicted from a view of one hemisphere of rotatable element 10, and in FIG. 8, third aspect surface 146 and fourth aspect surface 148 are depicted from a view of another hemisphere of rotatable element 10. In order to address rotatable element 10, the surface of aspect-transparent cladding 137 above first aspect surface 142 has first coating 130 at a first Zeta potential, and the surface of aspect-transparent cladding 137 above third aspect surface 146 has second coating 135 at a second Zeta potential such that first coating 130 has a net negative charge, "−," with respect to second coating 135 when rotatable element 10 is in contact with a dielectric fluid (not shown). One skilled in the art should appreciate that rotatable element 10 may also be fabricated without aspect-transparent cladding 137. Accordingly, rotatable element 10 may simply comprise a substantially cylindrical core 140 with a suitable choice of coatings or material in order to present four aspects to a favorably situated observer.

Another embodiment of a rotatable element with a multivalued aspect in depicted in FIGS. 9 and 10, and is composed of core 150 within aspect-transparent cladding 137. Core 150 in FIGS. 9 and 10 is prism-shaped and is depicted as a triangular column. Again, depending upon the orientation of rotatble element 10 about an axis of rotation through core 150, rotatable element 10 may present first aspect surface 152, second aspect surface 154, or third aspect surface 156 to a favorably situated observer. In FIG. 9, first aspect surface 152 and second aspect surface 154 are depicted from a view of one hemisphere of rotatable element 10, and in FIG. 10, third aspect surface 156 and first aspect surface 152 are depicted from a view of another hemisphere of rotatable element 10. In order to address rotatable element 10, the surface of aspect-transparent cladding 137 above first aspect surface 152 has first coating 130 at a first Zeta potential, and the surface of aspect-transparent cladding 137 above the apex where third aspect surface 156 and second aspect surface 154 meet has second coating 135 at a second Zeta potential such that first coating 130 has a net negative charge, "−," with respect to second coating 135 when rotatable element 10 is in contact with a dielectric fluid (not shown). Again, one skilled in the art should appreciate that rotatable element 10 may also be fabricated without aspect-transparent cladding 137. Accordingly, rotatable element 10 may simply comprise a substantially cylindrical core 150 with a suitable choice of coatings or material in order to present three aspects to a favorably situated observer.

U.S. Pat. No. 5,894,367 describes the fabrication of rotatable element 10 from a macroscopic display element possessing scaled-up portions of material desired in the rotatable element. The macroscopic display element is then manipulated to form an extended filament so as to preserve the proportions of the component material. One skilled in the art should appreciate that this technique has been used in the production of optical fibers and channel electron multipliers.

Rotatable elements with multivalued aspect are generally utilized in rotating element sheet material that use canted vector fields for addressing. A canted vector field is a field whose orientation vector in the vicinity of a subset of rotatable elements can be set so as to point in any direction in three-dimensional space. U.S. Pat. No. 5,717,515, herein incorporated by reference, discloses the use of canted vector fields in order to address rotatable elements. The use of canted vector fields with rotating element sheet material 50 allows complete freedom in addressing the orientation of a subset of rotatable elements, where the rotatable elements have the addressing polarity discussed above. Exemplary systems utilizing rotatable elements with four-valued aspects and canted vector fields for addressing are depicted in FIGS. 11–17.

In FIG. 11, no-field set 160 depicts a subset of randomly oriented rotatable elements in the vicinity of vector field 100 when vector field 100 has zero magnitude. In no-field set 160, the rotatable elements have arbitrary orientations. Therefore, observer 60 in the case of no-field set 160 registers views of the combination of the surface of first aspect surface 142, second aspect surface 144, third aspect surface 146, and fourth aspect surface 148 in an unordered sequence. Again, infralayer 55 forms the backdrop of the aspect.

FIGS. 12 and 13 depict second aspect set 164 of the system introduced in FIG. 11. In second aspect set 164, observer 60 registers a coherent view of the combination of the second aspect surface 144. In second aspect set 164, all of the rotatable elements orient themselves such that first aspect surface 142 lies in the direction indicated by arrow 105, where arrow 105 indicates the direction of canted vector field 100. FIG. 12 is a side view indicating the relative positions of observer 60, second aspect set 164, and infralayer 55. FIG. 13 is an alternate view of second aspect set 164 from a top perspective.

Again, one skilled in the art should appreciate that second aspect set 164 will maintain its aspect after applied vector field 100 is removed due to the energy associated with the attraction between rotatable element 10 and the substrate structure, as, for example, cavity walls (not shown). This energy contributes, in part, to the switching characteristics and the memory capability of rotating element sheet material 50, as disclosed in U.S. Pat. No. 4,126,854, hereinabove incorporated by reference.

Further still, one skilled in the art should appreciate that by suitable orientation of vector field 100, as indicted by arrow 105, any of the four aspects surfaces may be viewed by observer 60.

II.C. Rotatable Elements with Multivalued Aspect and Magnetic Latching

When utilizing rotatable elements with more than two aspects and a canted addressing vector field, it is desirable to ensure that an aspect that is addressed will be stable about an orientation that provides maximum viewing exposure for that aspect being viewed. One manner of accomplishing this is disclosed in U.S. Pat. No. 6,147,791 entitled "Gyricon displays utilizing rotating elements and magnetic latching," herein incorporated by reference. Multiaspect rotatable elements consistent with the invention disclosed in U.S. Pat. No. 6,147,791 are depicted in FIGS. 14 and 15. The rotatable elements of FIGS. 14 and 15 are similar to those depicted in FIGS. 7–10 and described above. The rotatable elements of FIGS. 14 and 15, however, also comprise element latching components 170, preferably located at the apex between aspect surfaces. FIG. 14 depicts a rotatable element with four aspects and four element latching components 170. Latching components 170 preferably extend along the entire axis of rotatable element 10. FIG. 15 depicts a rotatable element with three aspects and three element latching components 170. The element latching components 170 contained within the rotatable elements comprise hard magnetic material, as disclosed in U.S. Pat. No. 6,147,791, hereinabove incorporated by reference. "Hard" magnetic materials are materials that exhibit some residual magnetism in the absence of an external field, such as ferromagnetic material. Rotating element sheet material that provides maximum viewing exposure for an aspect being viewed and incorporating the rotatable elements of FIGS. 14 and 15 is depicted in FIGS. 16 and 17. FIG. 16 depicts rotating element sheet material 50 containing rotatable element 10 of FIG. 14 and includes sheet latching components 172. Similarly, FIG. 17 depicts rotating element sheet material 50 containing rotatable element 10 of FIG. 15 with sheet latching components 172. Sheet latching components 172 comprise soft magnetic material, or material that does not exhibit a significant amount of magnetization in the absence of an external field, such as paramagnetic material or superparamagnetic material. As depicted in FIGS. 16 and 17, the magnetic field that is present between element latching components 170 and sheet matching components 172 will induce a torque about the axis of rotation of the rotatable element for any orientation other than the one that minimizes the distance between element latching component 170 and sheet latching component 172.

One skilled in the art should also appreciate that the element latching components 170 and the sheet latching components 172 will contribute to the "work function" energy associated with the attraction between rotatable element 10 and the substrate structure, as, for example, cavity walls (not shown), and that contributed to aspect stability. Again, this energy will contribute, in part, to the switching characteristics and the memory capability of rotating element sheet material 50, as disclosed in U.S. Pat. No. 4,126,854, hereinabove incorporated by reference.

II.D. Parity Vector

One skilled in the art should appreciate that there is an additional parameter associated with multiaspect rotatable elements as depicted in FIGS. 7–17. Specifically, such multiaspect rotatable elements that utilize canted vector fields for addressing will exhibit a "parity vector." The parity vector is a vector parallel to the axis of rotatation of a multiaspect rotatable element and will have a direction associated with a specific ordering of multiaspect surfaces when proceeding in, for example, a clockwise rotation about the parity vector. Parity vector 270, in one embodiment, is depicted in FIGS. 18 and 19. For exemplary purposes only, rotatable element 10 in FIGS. 18 and 19 is configured such that first aspect surface 142 exhibits a red aspect, second aspect surface 144 exhibits a green aspect, third aspect surface 146 exhibits a blue aspect, and fourth aspect surface 140 exhibits a white aspect. This is depicted in FIGS. 18 and 19 by the use of the labels "R," "G," "B," and "K" respectively. Parity vector 270 is parallel to the axis of rotation and is selected in FIGS. 18 and 19 to be in the same direction as a vector directed out of the axis of the rotatable element when a clockwise rotation (as indicated by arrow 271) produces the sequence "R," "K," "B," "G," "R," etc. to favorably situated observer 60 (FIG. 18). Accordingly, parity vector 270 is parallel to the axis of rotation and is selected to be in the same direction as a vector directed into the axis of the rotatable element when a counterclockwise rotation (as indicated by arrow 273) produces the sequence "R," "K," "B," "G," "R," etc. to favorably situated observer 60 (FIG. 19).

When addressing a plurality of multiaspect rotatable elements using a canted vector field, it is important that all of the rotatable elements in the rotating element sheet material exhibit a parity vector in the same direction. It is important due to the fact that a canted vector field directed to, for example, the right as in FIGS. 12 and 13 will cause the plurality of rotatable elements to exhibit the same aspect surface only if all of the parity vectors of the plurality of rotatable elements point in the same direction. One method of ensuring that a plurality of rotatable elements share the same parity vector is by magnetizing the rotatable element along the parity vector when it is manufactured, and prior to dispersing the plurality of rotatable elements to a plurality of cavities in the substrate. When the plurality of rotatable elements are dispersed in the substrate, as depicted in FIG. 20, the rotatable elements may be easily induced to self-align according to the magnetic polarity, and hence the parity vector. Accordingly, after the rotatable elements have been secured in the substrate and are ready to be addressed by an addressing vector field (as an electric field), they will exhibit the same direction for the plurality of parity vectors 270.

II.E. Work Function

As discussed above, a useful property of rotating element sheet material is the ability to maintain a given aspect after applied vector field 100 for addressing is removed. This ability contributes, in part, to the switching characteristics and the memory capability of rotating element sheet material 50, as disclosed in U.S. Pat. No. 4,126,854, hereinabove incorporated by reference. This will be referred to as aspect stability. The mechanism for aspect stability in the above embodiments is generally the energy associated with the attraction between the rotatable elements and the containment structure, or "work function." A host of factors influence the magnitude of the energy associated with the work function including, but not limited to: surface tension of enabling fluid in contact with rotatable elements; the relative specific gravity of the rotatable elements to the enabling fluid; magnitude of charge on rotatable elements in contact with containment structure; relative electronic permittivity of enabling fluid and containment structure; "stickiness" of containment structure; and other residual fields that may be present. The applied vector field for addressing must be strong enough to overcome the work function in order to cause an orientation change; furthermore, the work function must be strong enough to maintain this aspect in the absence of an applied vector field for addressing.

FIG. 21 depicts an exemplary diagram of number 180, N, of rotatable elements that change orientation as a function of applied vector field 102, V of the prior art. The work function 184, $V_w$, corresponds to the value of applied vector field 102 when the number 180 of rotatable elements that change orientation has reached the saturation level 186, $N_s$, corresponding to the orientation change of all rotatable elements 10.

II.F. Use of Magnetic Fields for Addressing

One manner of introducing a magnetic field to a region is depicted in FIG. 22. One skilled in the art should appreciate that a current 190, I, introduced to a current loop 194, will create a magnetic field. Exemplary flux lines 196 associated with the current 190 and current loop 194 are also depicted. Another manner of introducing a magnetic field to a region (not shown) is to introduce material to the region that exhibits inherent magnetization, such as a stylus composed of ferromagnetic material.

Again, in order to address rotatable elements with a vector field, the vector field must provide enough energy to overcome the work function. Conventionally, this energy has been provided by the interaction between a dipole and a vector field. One skilled in the art should appreciate that the energy U associated with the interaction of a dipole d in a vector field V may be expressed as a dot product between the dipole and vector field:

$$U = -d \cdot V$$

Lee (L. L. Lee, "A Magnetic Particles Display," IEEE Trans. On Elect. Devices, Vol. ED-22, Number 9, September 1975 and L. L. Lee, "Matrix Addressed Magnetic Particles Display," in 1977 Soc. For Information Display International Symposium, Digest of Technical Papers, Boston, April 1977) has described the addressing of a twisting rotating element display in which the rotatable elements have a magnetic dipole with magnetic fields. U.S. Pat. No. 3,036,388 by Tate, and issued in May 1962 uses a stylus consisting of a magnetic dipole to address a display consisting of magnetized particles having black and white surfaces corresponding to a given magnetic polarity. More recently, U.S. Pat. No. 5,411,398 by Nakanishi et al. and entitled "Magnetic Display System" describes the use of a magnetic dipole to address a display consisting of black ferromagnetic particles and white, non-magnetic particles dispersed in an oil and in turn contained in microcapsules arranged in a layer. Upon application of a magnetic dipole, the black ferromagnetic particles are pushed to the rear of the microcapsules, revealing only the white particles, or pulled to the front of the microcapsules so that mostly only the black ferromagnetic particles can be seen by an observer.

It remains desirable, therefore, to utilize alternative forms of addressing rotating element sheet material in order to produce an aspect to a favorably situated observer. Specifically, it remains desirable to address multiaspect rotatable elements with a stylus in a simple manner.

III. SUMMARY OF INVENTION

In a first embodiment, the kit of the present invention comprises rotating element sheet material and a gradient field stylus, where the rotating element sheet material comprises a plurality of rotatable elements disposed in a substrate and in contact with an enabling fluid; where the substrate comprises a plurality of sheet latching components; where at least one of the plurality of rotatable elements comprises a core configured to present a first aspect in a first orientation and a second aspect in a second orientation; and at least a first rotatable latching component and a second rotatable latching component; where the first orientation and the second orientation are related by a rotational transformation about an axis of the rotatable element; and where at least one of the plurality of sheet latching components is proximal to the first rotatable latching component in the first orientation; and where the sheet latching component is proximal to the second rotatable latching component in the second orientation; and where the rotatable latching components and the sheet latching component are configured to exhibit an attractive force when proximal based on a first gradient field; and where a distal end of the gradient field stylus is configured to exhibit an attractive force with the rotatable latching components when proximal based on a second gradient field.

In another embodiment, a method of addressing rotating element sheet material comprises: providing the rotating element sheet material described above with the first rotatable latching component proximal to the sheet latching component; providing the gradient field stylus described above; and moving the gradient field stylus across the substrate such that the attractive force between the second rotatable latching component and the distal end of the gradient field stylus is first lesser than the attractive force between the first rotatable latching component and the sheet latching component, then greater than the attractive force between the first rotatable latching element and the sheet latching component, then lesser than the attractive force between the second rotatable latching component and the sheet latching component; where the motion of the distal end of the gradient field stylus coupled with the second rotatable latching component causes the rotatable element to rotate from an orientation where first rotatable latching component is proximal to the sheet latching component to an orientation where second rotatable latching component is proximal to the sheet latching component.

In another embodiment, a method of addressing rotating element sheet material comprises the steps recited above; and further comprises providing a vector field through the substrate such that the rotatable element is in the first orientation.

IV. BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings, FIG. 1 depicts rotating element sheet material of the prior art;

V. DETAILED DESCRIPTION

Figures 1, 2:
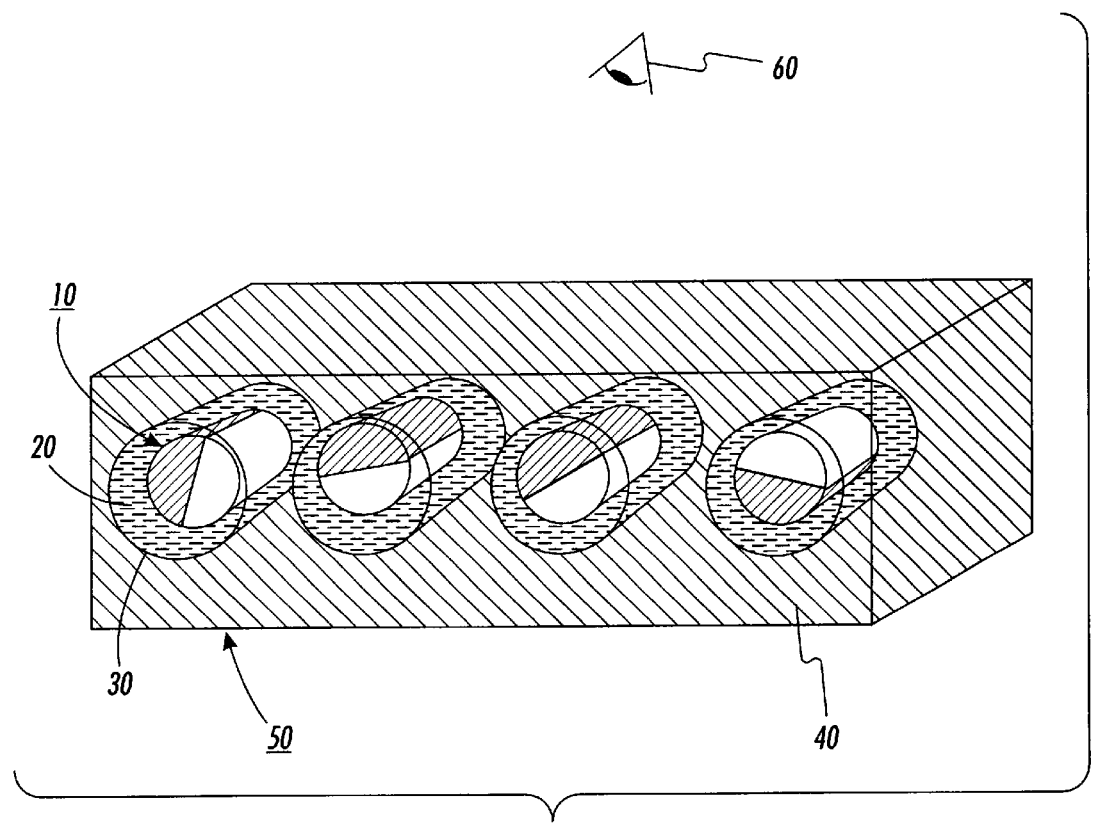
FIG. 2 depicts another view of rotating element sheet material of the prior art.
Figure 3:
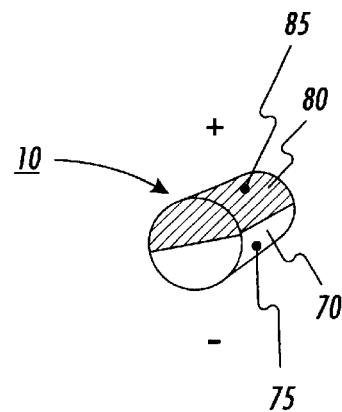
FIG. 3 depicts a rotatable element of the prior art.
Figure 4:
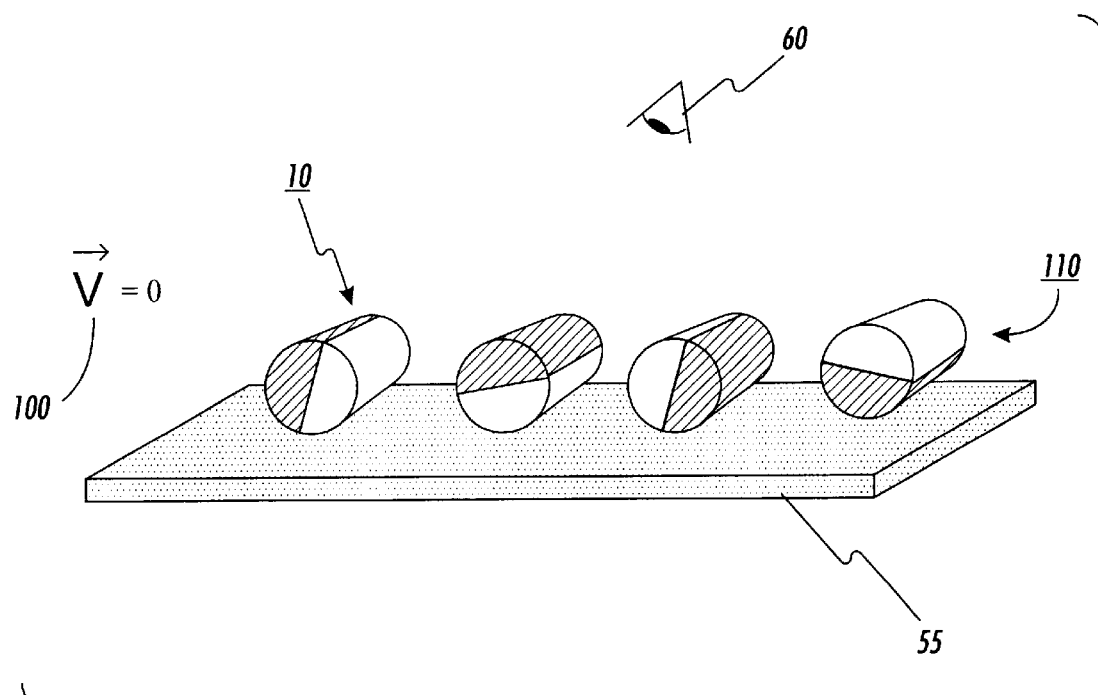
FIG. 4 depicts a set of rotatable elements of the prior art in the presence of an addressing vector field with zero amplitude.
Figure 5:
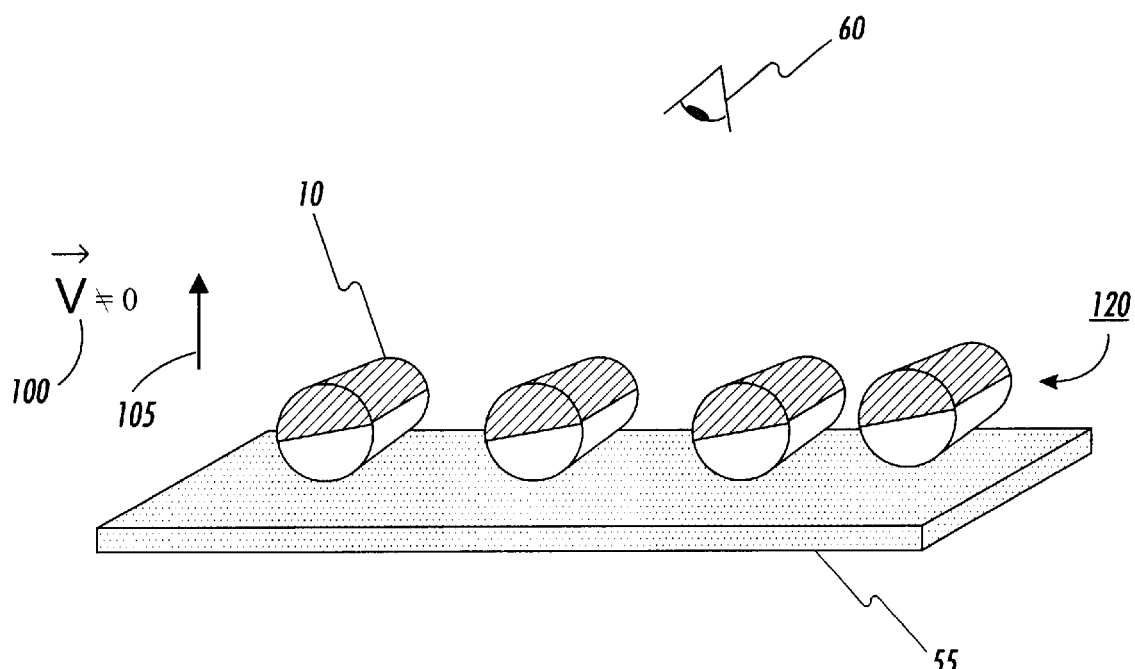
FIG. 5 depicts a set of rotatable elements of the prior art in the presence of an addressing vector field with nonzero magnitude.
Figure 6:
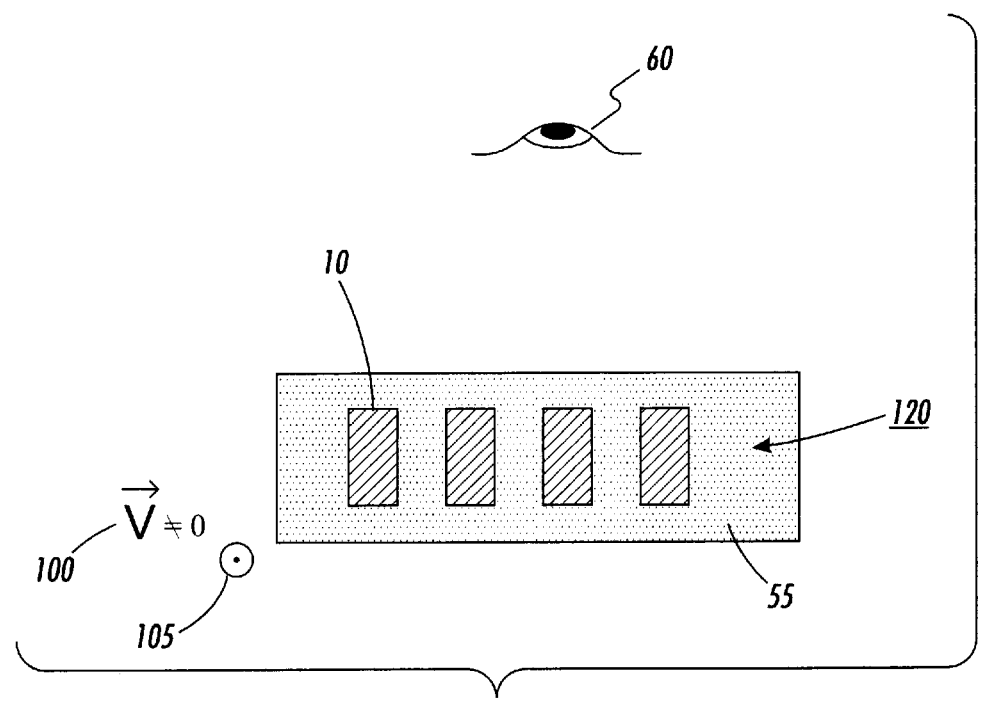
FIG. 6 depicts an alternate view of the set of rotatable elements of FIG. 5.
Figure 7:
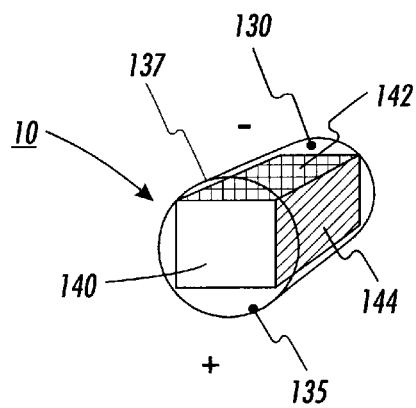
FIG. 7 depicts a rotatable element of the prior art with multivalued aspect.
Figure 8:
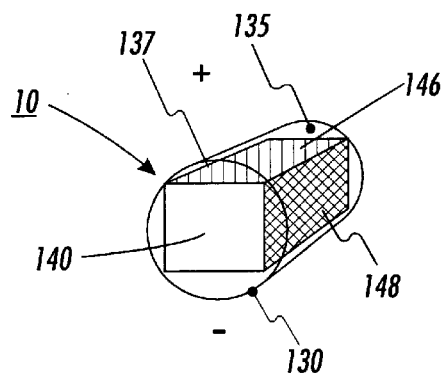
FIG. 8 depicts another perspective of the rotatable element of FIG. 7.
Figure 9:
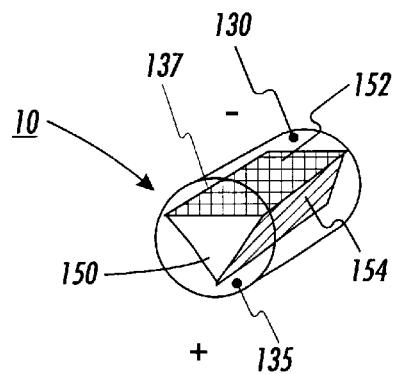
FIG. 9 depicts another rotatable element of the prior art with ultivalued aspect.
Figure 10:
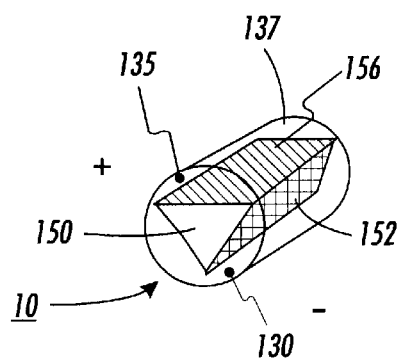
FIG. 10 depicts another persepctive of the rotatable element of FIG. 9.
Figure 11:
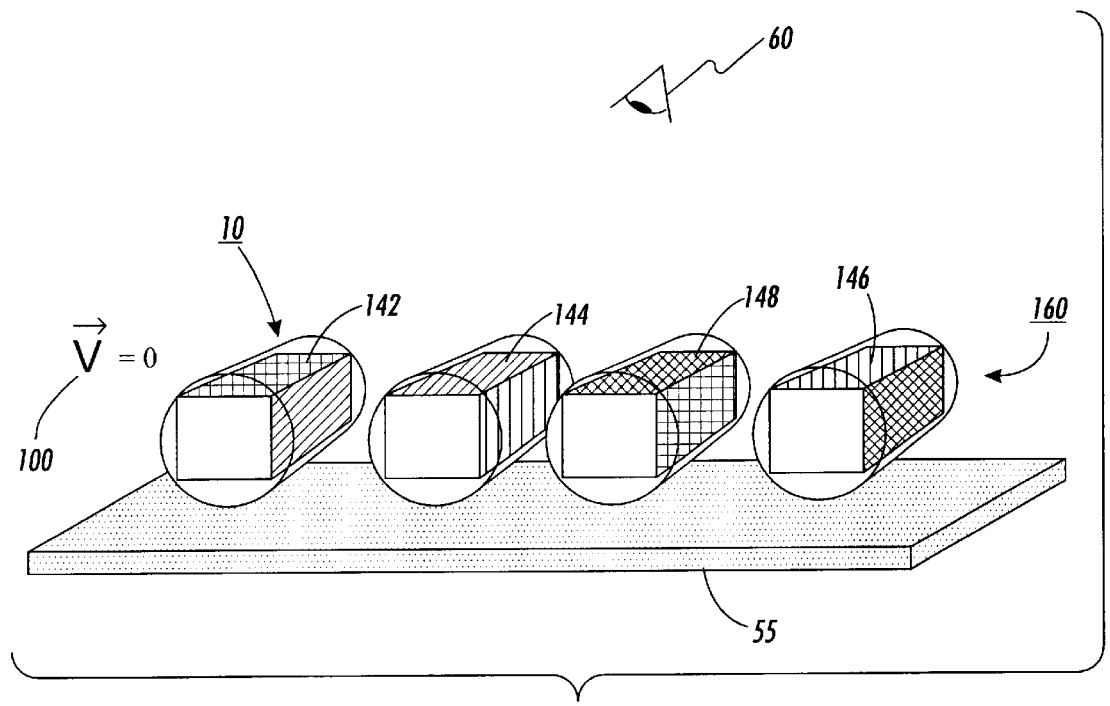
FIG. 11 depicts a set of rotatable elements from FIGS. 7 and 8 in the presence of an addressing vector field with zero magnitude.
Figure 12:
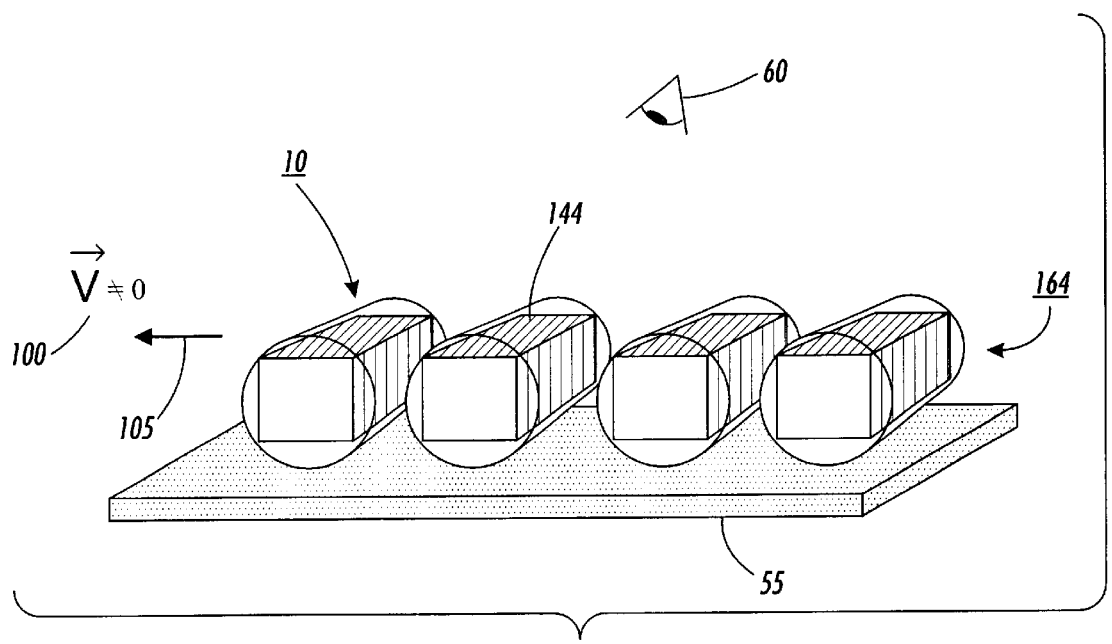
FIG. 12 depicts a set of rotatable elements from FIGS. 7 and 8 in the presence of an addressing vector field with nonzero magnitude.
Figure 13:
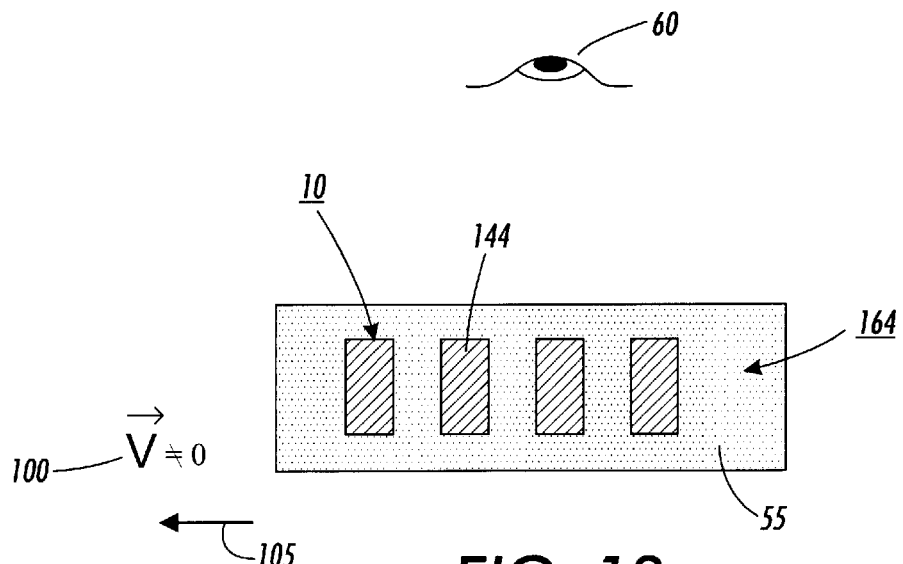
FIG. 13 is another perspective of the set of rotatable elements from FIG. 12.
Figure 14:
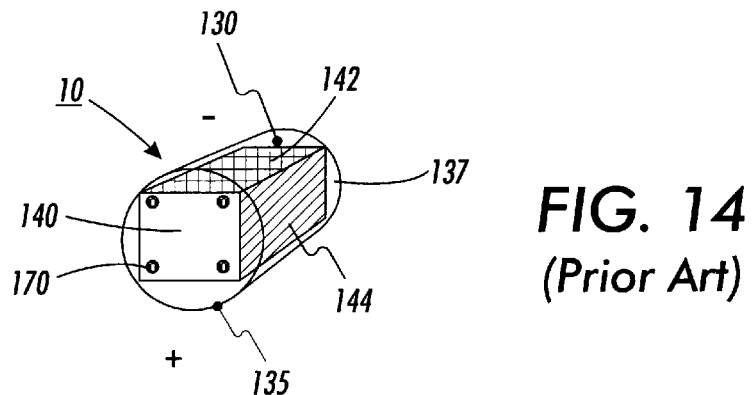
FIG. 14 depicts a rotatable element of the prior art with mutlivalued aspect and with latching components.
Figure 15:
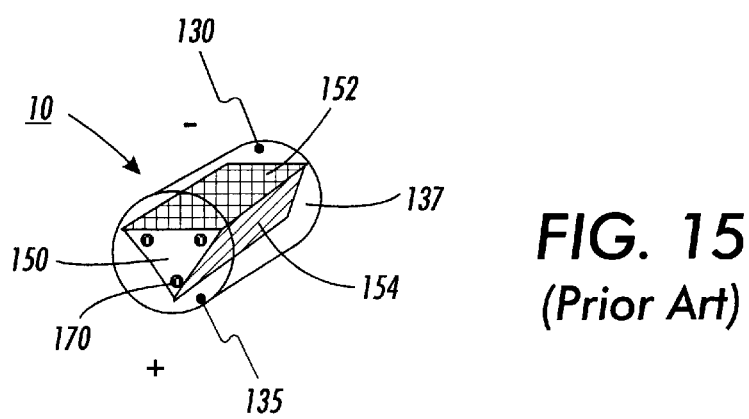
FIG. 15 depicts another rotatable element of the prior art with multivalued aspect and with latching components.
Figure 16:
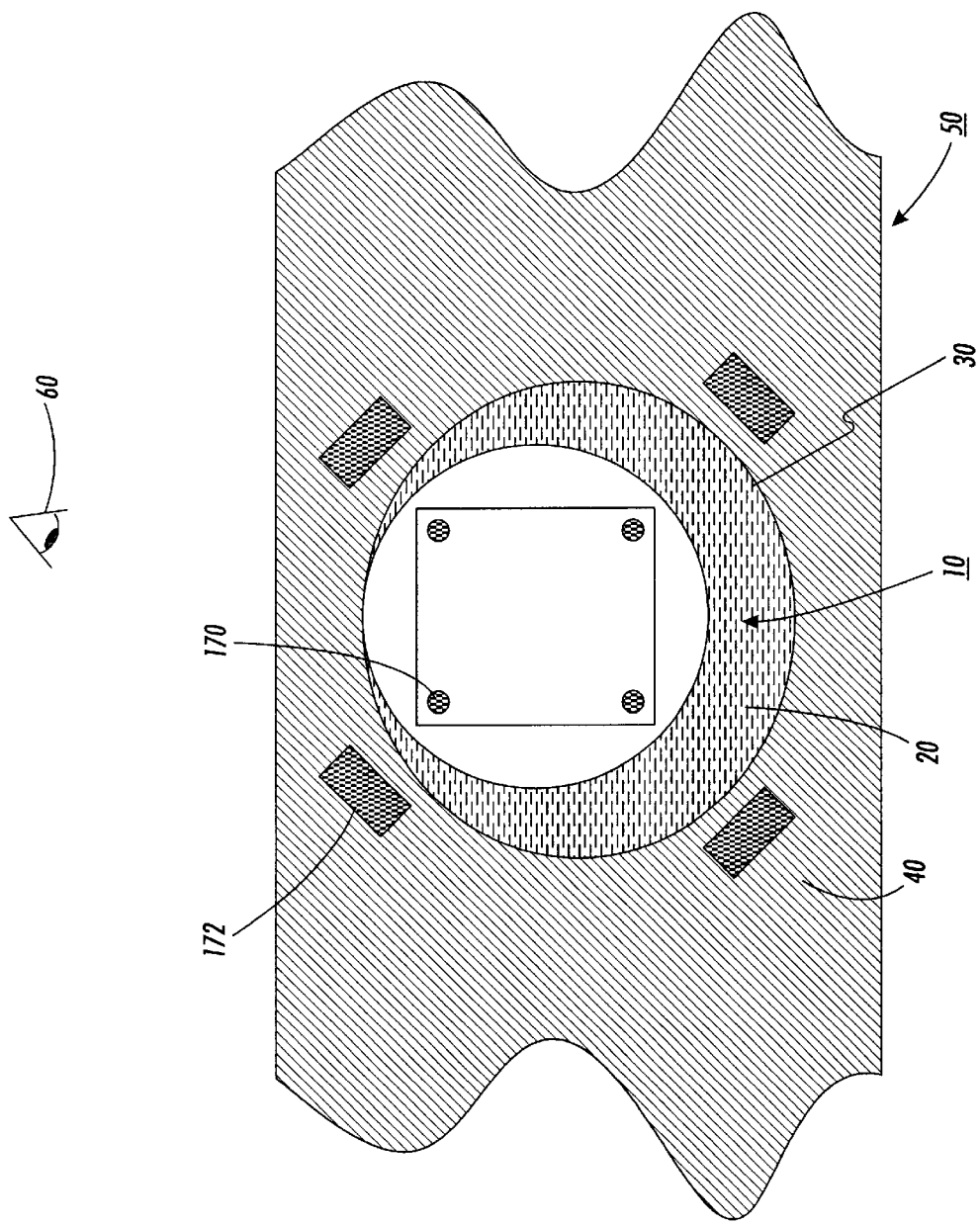
FIG. 16 depicts rotating element sheet material including the rotatable element of FIG. 14 and including sheet latching components.
Figure 17:
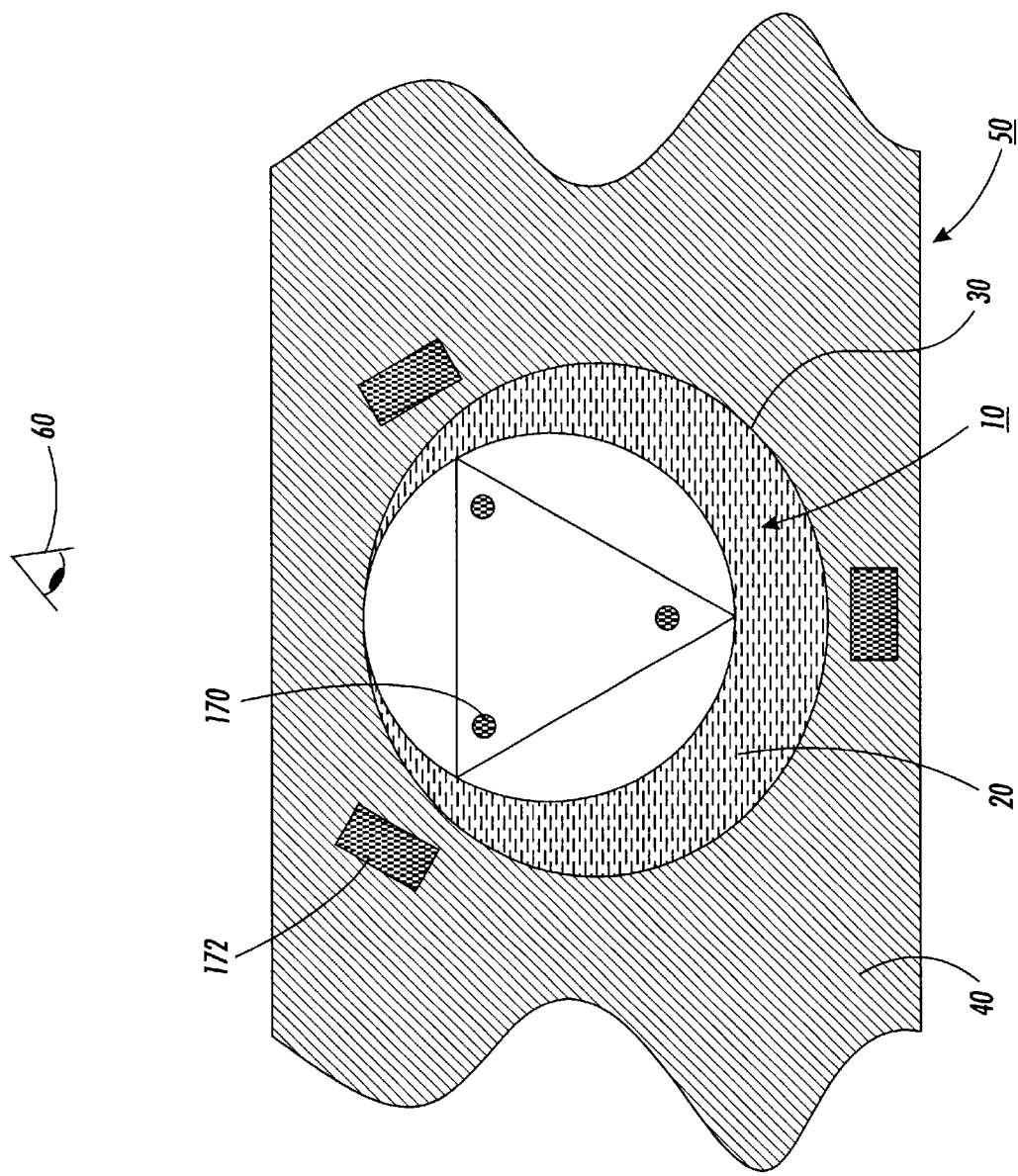
FIG. 17 depicts rotating element sheet material including the rotatable element of FIG. 15 and including sheet latching components.
Figure 18:
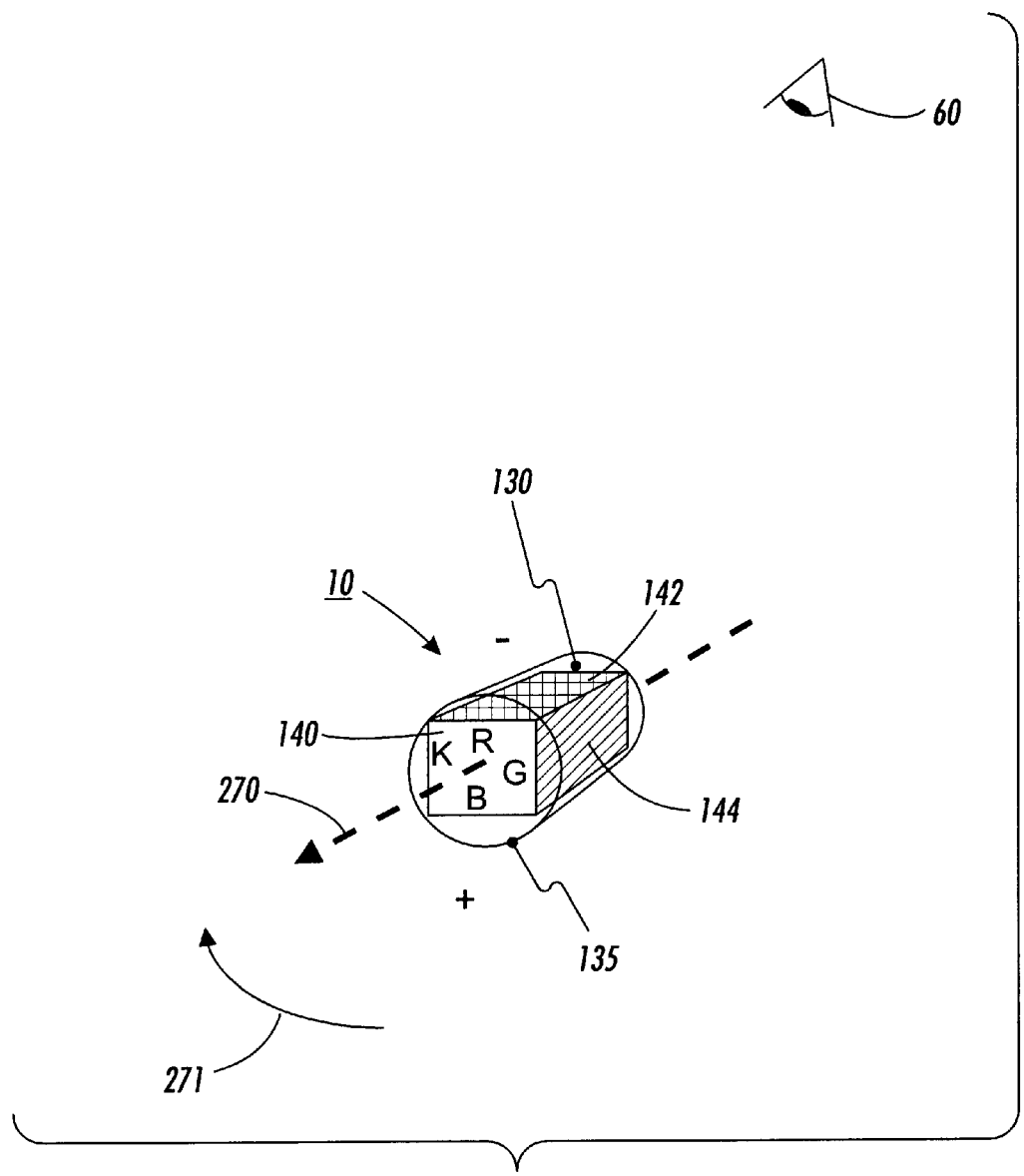
FIG. 18 depicts a multiaspect rotatable element of the prior art with a selected parity vector.
Figure 19:
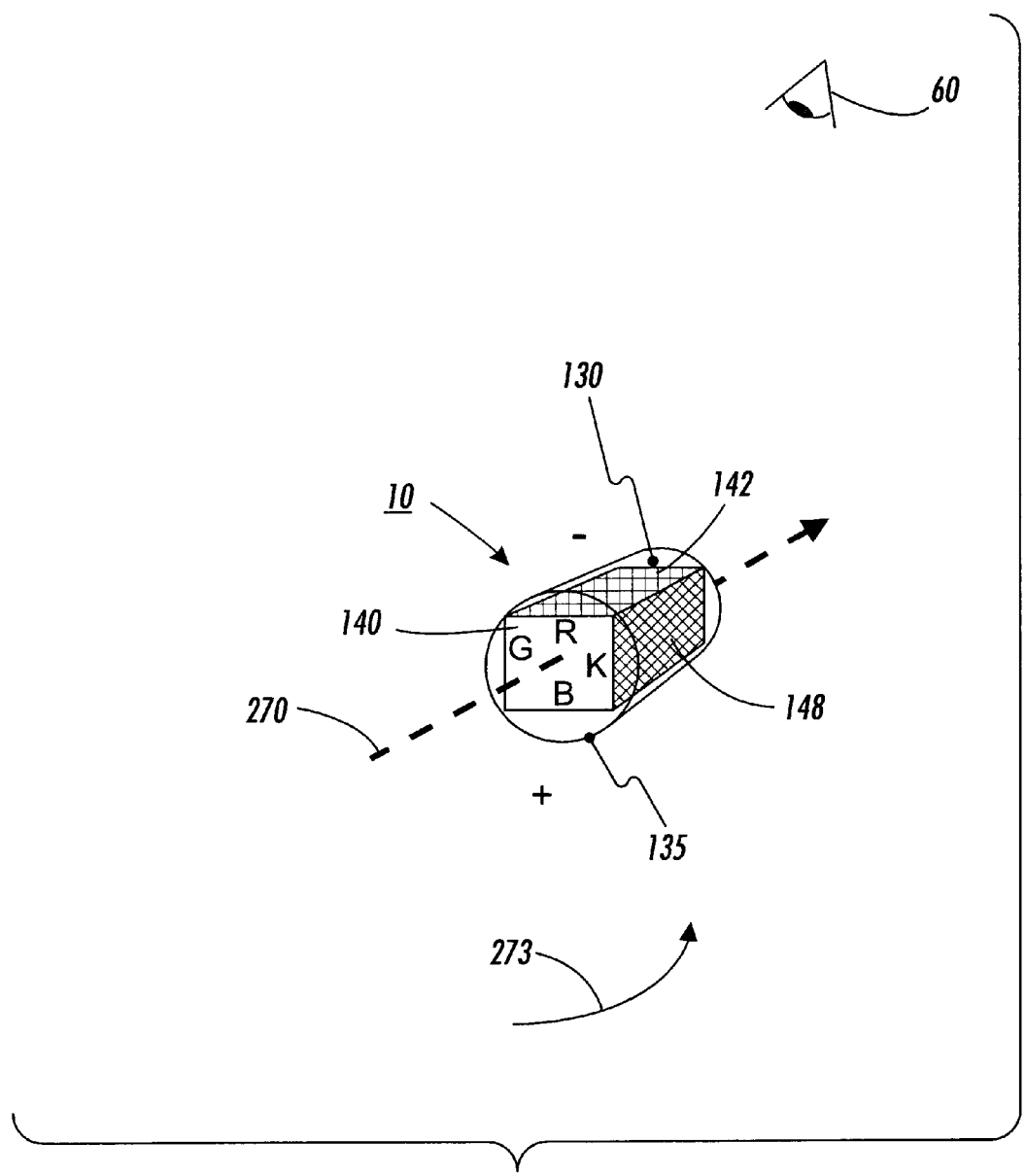
FIG. 19 depicts the rotatable element of FIG. 18 from another perspective.
Figure 20:
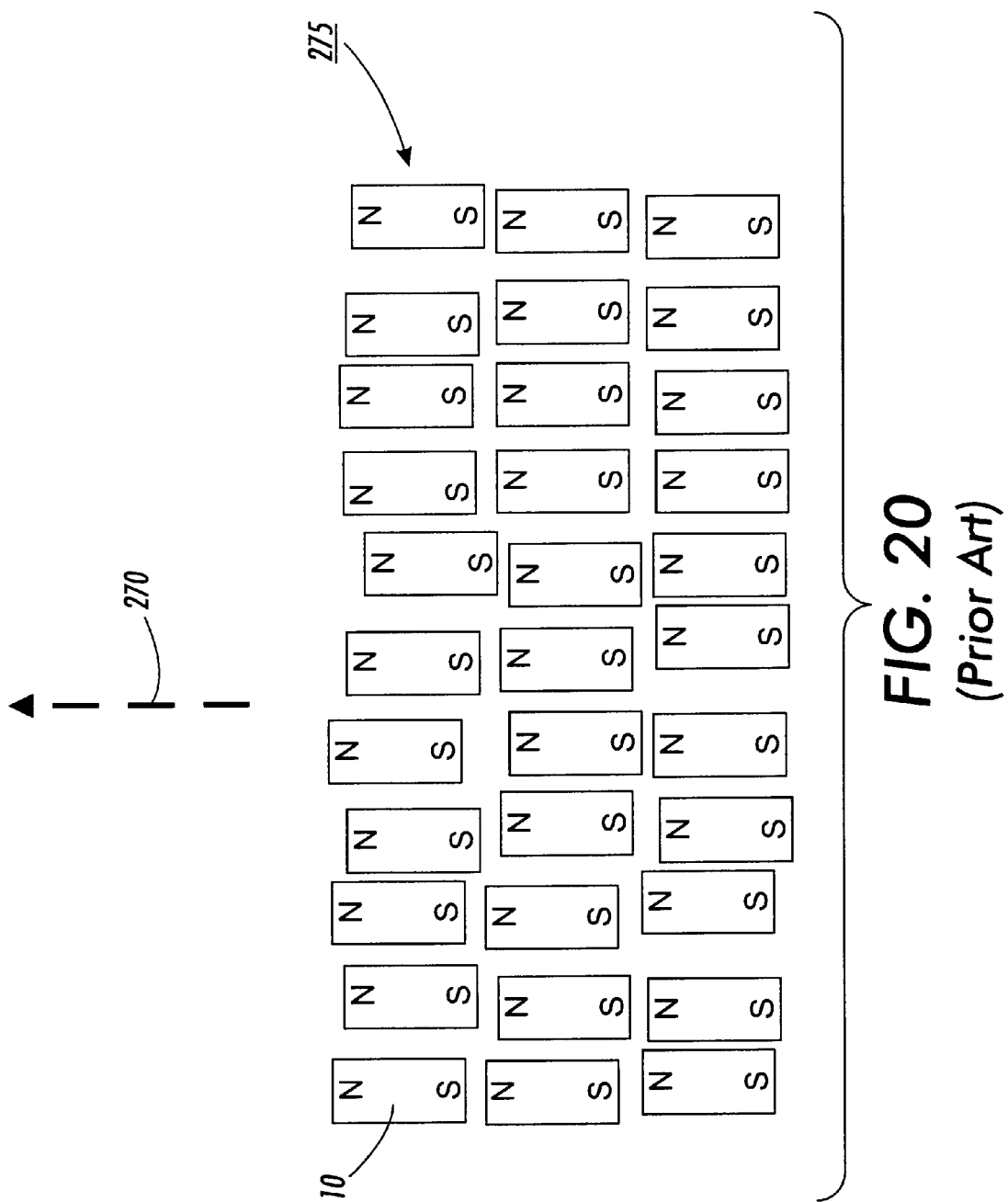
FIG. 20 depicts a method of the prior art of assembling a plurality of rotatable elements to share the same parity vector.
Figure 21:
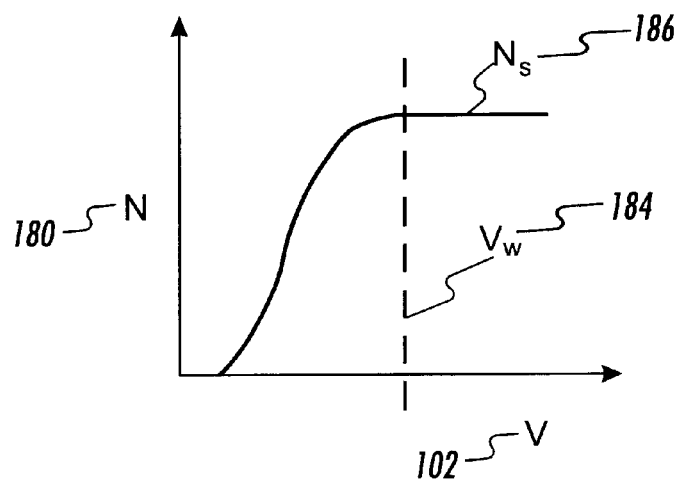
FIG. 21 is an exemplary graph of the number of rotatable elements that undergo a change in orientation as a function of applied vector field.
Figure 22:
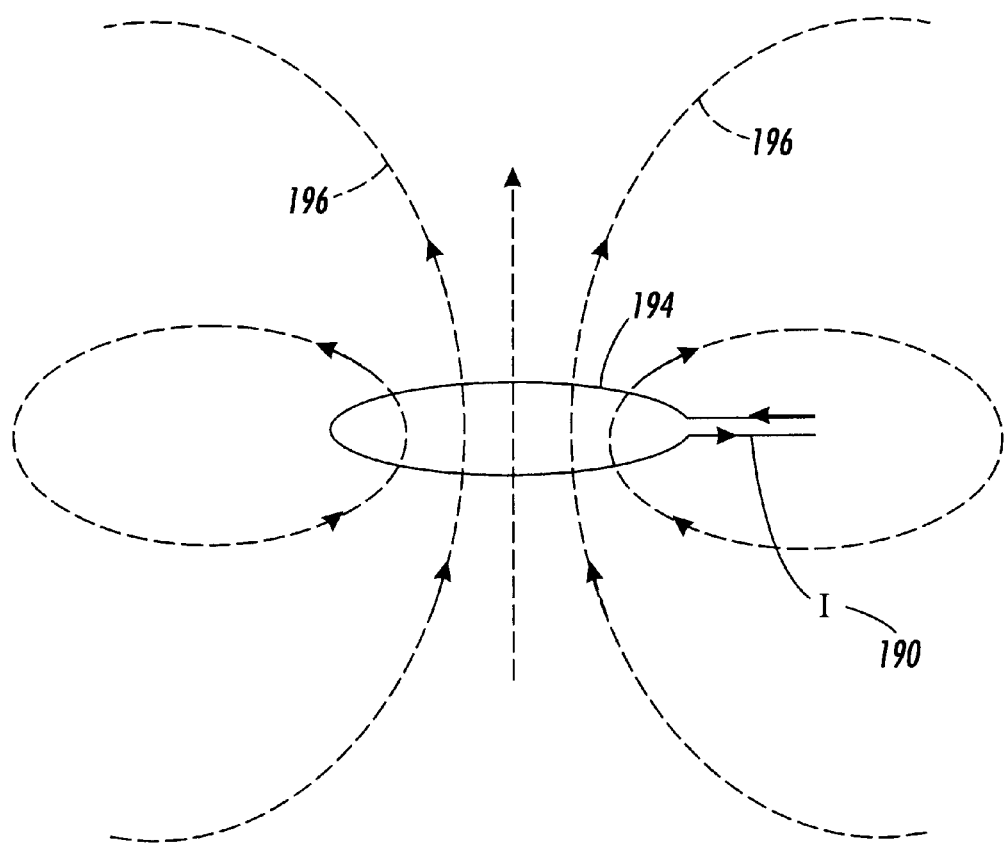
FIG. 22 depicts one manner of the prior art of introducing a magnetic field to a region.

Reference will now be made in detail to an implementation consistent with the present invention as illustrated in the accompanying drawings. Whenever possible, the same reference number will be used throughout the drawings and the following description to refer to the same or like parts.

V.A Definitions

As used herein, "aspect" refers to a common response to incident electromagnetic energy of interest. For example, if the incident electromagnetic energy of interest lies in the visible spectrum, then a first aspect may correspond to a black appearance, and a second aspect may correspond to a white appearance. If the incident electromagnetic energy of interest lies in the x-ray region, then a first aspect may correspond to the transmission of the x-ray energy, while a second aspect may correspond to the absorption of the x-ray energy. Furthermore, the "common response" may comprise any of the phenomena of absorption, reflection, polarization, transmission, fluorescence, or any combination thereof.

As used herein, "observer" refers to a human perceiver, or to a human perceiver in conjunction with an apparatus sensitive to the electromagnetic energy of interest. If the electromagnetic energy of interest lies in the visible spectrum, then observer may refer to a human perceiver. If the electromagnetic energy of interest lies outside of the visible spectrum, then observer refers to an apparatus sensitive to the electromagnetic energy and capable of resolving the aspects of interest into human perceivable form.

As used herein, "diameter" refers to an order of magnitude dimension corresponding to any of height, width, and depth of any microencapsulation structure or aspect elements. The use of "diameter" does not imply that circular, spherical, or cylindrical geometry only is under consideration.

As used herein, "vector field" refers to a field whose amplitude in space is capable of having a magnitude and a direction. Vector fields of interest in the present invention include electric fields, magnetic fields, or electromagnetic fields.

As used herein, "gradient field" refers to a vector field that is localized to some region, and therefore has a magnitude and direction that is not substantially uniform over the scale of interest.

As used herein, "work function" refers to the amount of energy necessary to overcome the attraction between an aspect element and the microencapsulation structure so as to enable displacement. As mentioned above, a host of factors influence the magnitude of the energy associated with the work function including, but not limited to: surface tension of first aspect medium in contact with second aspect element; the relative specific gravity of first aspect medium to second aspect element; magnitude of charge on second aspect element; relative electronic permittivity of first aspect medium and microencapsulation structure; "stickiness" of microencapsulation structure; and other residual fields that may be present.

As used herein, "parity vector" refers to a vector in the direction of a vector product of a second vector and a first vector (in that order), where the first vector is defined by the direction of the first aspect surface from the axis of rotation and the second vector is defined by the direction of the second aspect surface from the axis of rotation of the rotatable element. One skilled in the art should appreciate that, in some instances, it is preferable to arrange multi-aspect rotatable elements in a substrate such that all of the parity vectors of the rotatable elements are in the same direction.

As used herein, the term "prism-shaped" refers to a polyhedron whose ends have substantially the same size and shape and are substantially parallel, and whose remaining sides are each substantially parallelograms.

V.B. Rotatable Element Consistent with the Present Invention

Figure 23:
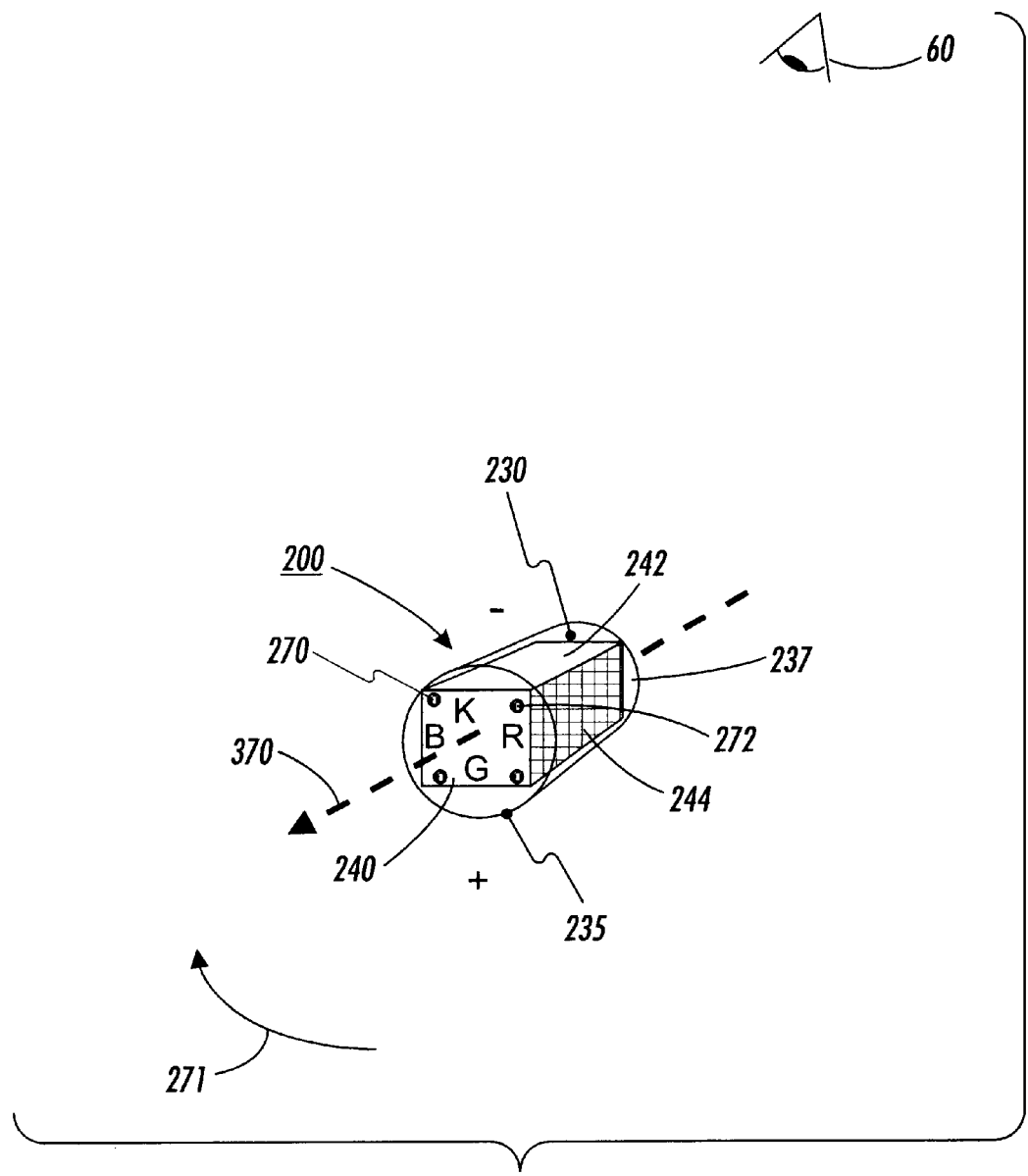
FIG. 23 depicts a rotatable element consistent with the present invention.
Figure 24:
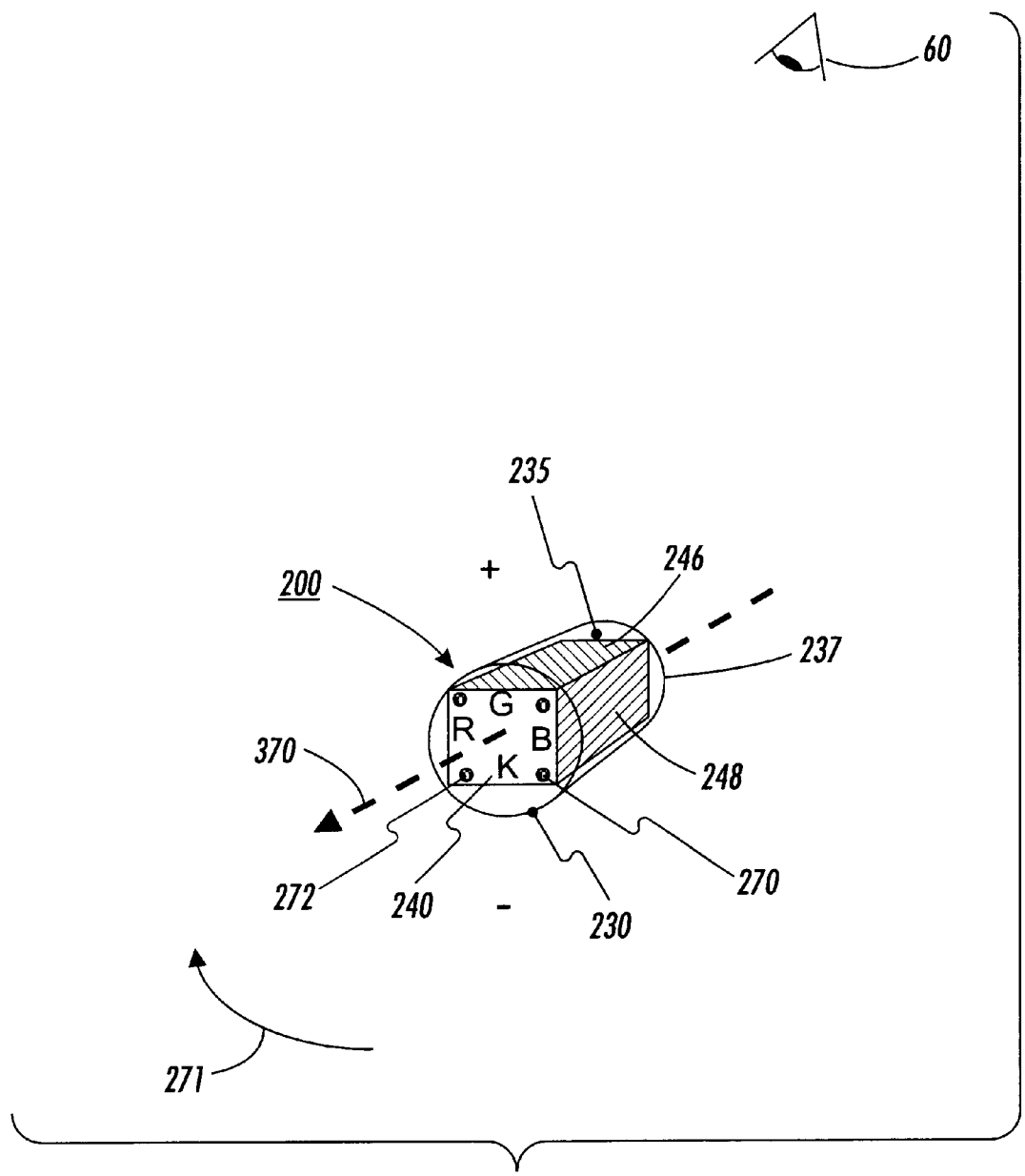
FIG. 24 depicts another view of the rotatable element from FIG. 23.

Rotatable element 200 consistent with a preferred embodiment of the present invention is depicted in FIGS. 23 and 24. Rotatable element 200 in FIGS. 23 and 24 comprises core 240 and aspect-transparent cladding 237. Core 240 in FIGS. 23 and 24 is prism-shaped, and is depicted as a square column. Core 240 further comprises first rotatable latching component 270 and second rotatable latching component 272. In a preferred embodiment, first rotatable latching component 270 and second rotatable latching component 272 comprise material that exhibits magnetism in the absence of an external magnetic field, such as ferromagnetic material. Rotatable element 200 is further configured to respond to visible light in distinguishable ways. This is indicated in FIGS. 23 and 24 by the use of the labels "K" for white on first aspect surface 242, "R" for red on second aspect surface 244, "G" for green on third aspect surface 246, and "B" for blue on fourth aspect surface 248. Also shown in FIGS. 23 and 24 is parity vector 370, which is selected to correspond to a direction along the axis of rotation of rotatable element such that a clockwise rotation of rotatable element 200 (indicated by arrow 271) results in the sequence of views to a favorably situated observer 60: "K," "B," "G," "R," and "K."

Rotatable element 200 is further configured such that the surface of aspect-transparent cladding 237 above first aspect surface 242 has first coating 230 at a first Zeta potential, and the surface of aspect-transparent cladding 237 above third aspect surface 246 has second coating 235 at a second Zeta potential such that first coating 230 has a net negative charge, "−" with respect to second coating 235 when rotatable element 200 is in contact with a dielectric fluid (not shown).

Accordingly, rotatable element 200 consistent with one embodiment of the present invention is configured to exhibit an electric dipole when rotatable element 200 is in contact with a dielectric fluid (not shown).

Suitable optically transparent materials for aspect-transparent cladding 237 include the polycarbonate polymers, the acrylic polymers and the polyolefin polymers, such as Polywax 1000 by the Baker Petrolite Corp. and the various grades of TPX by the Mitsui Petrochemical Inductries, Ltd. These would be used in combinations, since each can be expected to have a different Zeta potential in contact with the enabling fluid. These materials are also generally suitable for the fabrication of the other parts of rotatable element 200, as described in pending U.S. patent application Ser. No. 09/427,656, herein incorporated by reference. A suitable magnetic pigment which may be incorporated into rotatable element 200 is magnetic pigment type 031182 by Wright Industries, Brooklyn, N.Y., either alone or in conjunction with other pigments known in the art, such as AKER CHEMICAL Cresyl violet blue, BAKER CHEMICAL Rhodamine 6G, DUPONT Rhodamine BI, DUPONT Spirit Blue NS, DUPONT Victoria Blue B base, ALLIED CHEMICALS Iosol Blue, EASTMAN Acridine orange, CALCO OIL blue N, and CALCO OIL black, DUPONT R900 titanium dioxide, FERRO 6331 black pigment, CABOT MOGUL L carbon black, and CABOT MONARCH 1000 carbon black.

One skilled in the art should appreciate that rotatable element 200 may also be fabricated without aspect-transparent cladding 237. Accordingly, rotatable element 200 may simply comprise core 240 in, for example, a substantially cylindrical shape with a suitable choice of coatings or material in order to present four aspects to a favorably situated observer.

V.C. Rotating Element Sheet Material Consistent with the Present Invention

Figure 25:
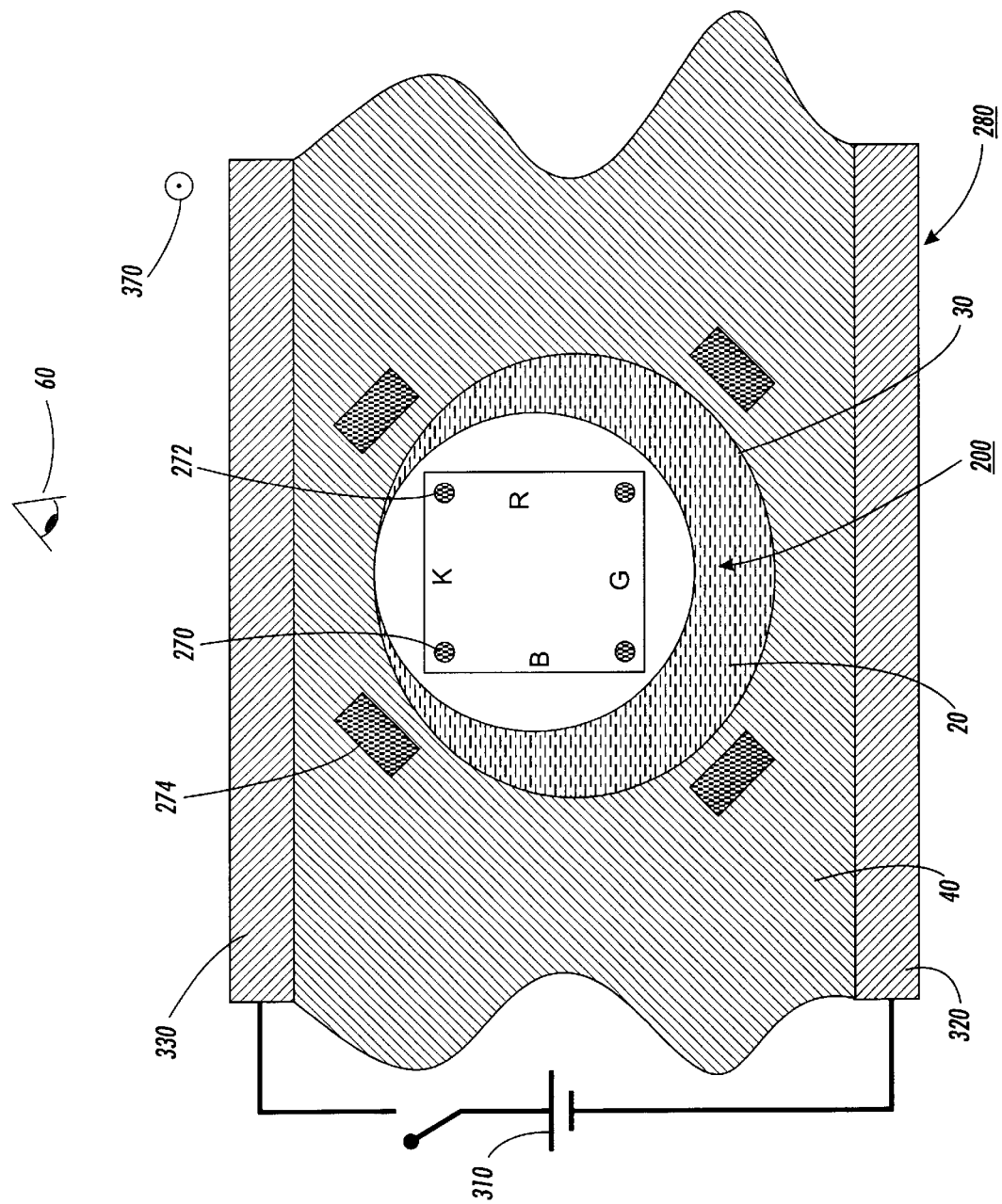
FIG. 25 depicts the rotatable element of FIGS. 23 and 24 within a substrate containing a plurality of sheet latching components.

FIG. 25 depicts a subsection of rotating element sheet material 280 consistent with an embodiment of the present invention. Rotatable element 200 from FIGS. 23 and 24 is dispersed in cavity 30 and in contact with enabling fluid 20. The details associated with the manufacture of rotatable elements 200 and rotating element sheet material 280 has been disclosed in U.S. Pat. Nos. 6,110,538, 6,147,791, U.S. patent application Ser. Nos. 09/199,544, 09/199,818, and 09/199,543, all hereinabove incorporated by reference and assigned to the same assignee. Substrate 40 contains a plurality of sheet latching components. One of the plurality of sheet latching components, sheet latching component 274, is depicted as proximal to first rotatable latching component 270 when first aspect surface 242 (depicted as "K") may be viewed by a favorably situated observer 60. Rotatable latching component 270 and sheet latching component 274 are configured such that an attractive force is present between them when they are proximal. For example, if rotatable latching component 270 comprises ferromagnetic material and sheet latching component 274 comprises paramagnetic material or superparamagnetic material, then a magnetic attractive force will be induced. Such a system was disclosed in U.S. Pat. No. 6,147,791, hereinabove incorporated by reference, in order to "lock" rotatable element 200 in place. One skilled in the art will appreciate that the distribution of sheet latching components depicted in FIG. 25 will contribute to aspect stability after the rotatable element 200 has been oriented under the influence of an external field. A method of introducing an external vector field is also depicted in FIG. 25. First overlay 330 is conducting and transparent to the aspect of interest in a preferred embodiment. Second overlay 320 is also conducting. Power source 310 is depicted as a simple voltage source with a switch in the "open" position. When the switch is closed, and a voltage difference sufficient to overcome the work function associated with aspect stability is generated across substrate 40, rotatable element 200 will become oriented such that the portion of rotatable element 200 with a net negative charge when in contact with enabling fluid 20 will be directed towards the positively charged overlay, and the portion of rotatable element 200 with a net positive charge when in contact with enabling fluid 20 will be directed towards the negatively charged overlay. FIG. 25 also depicts parity vector 370 as an arrow directed out of the plane of the figure.

Figure 26:
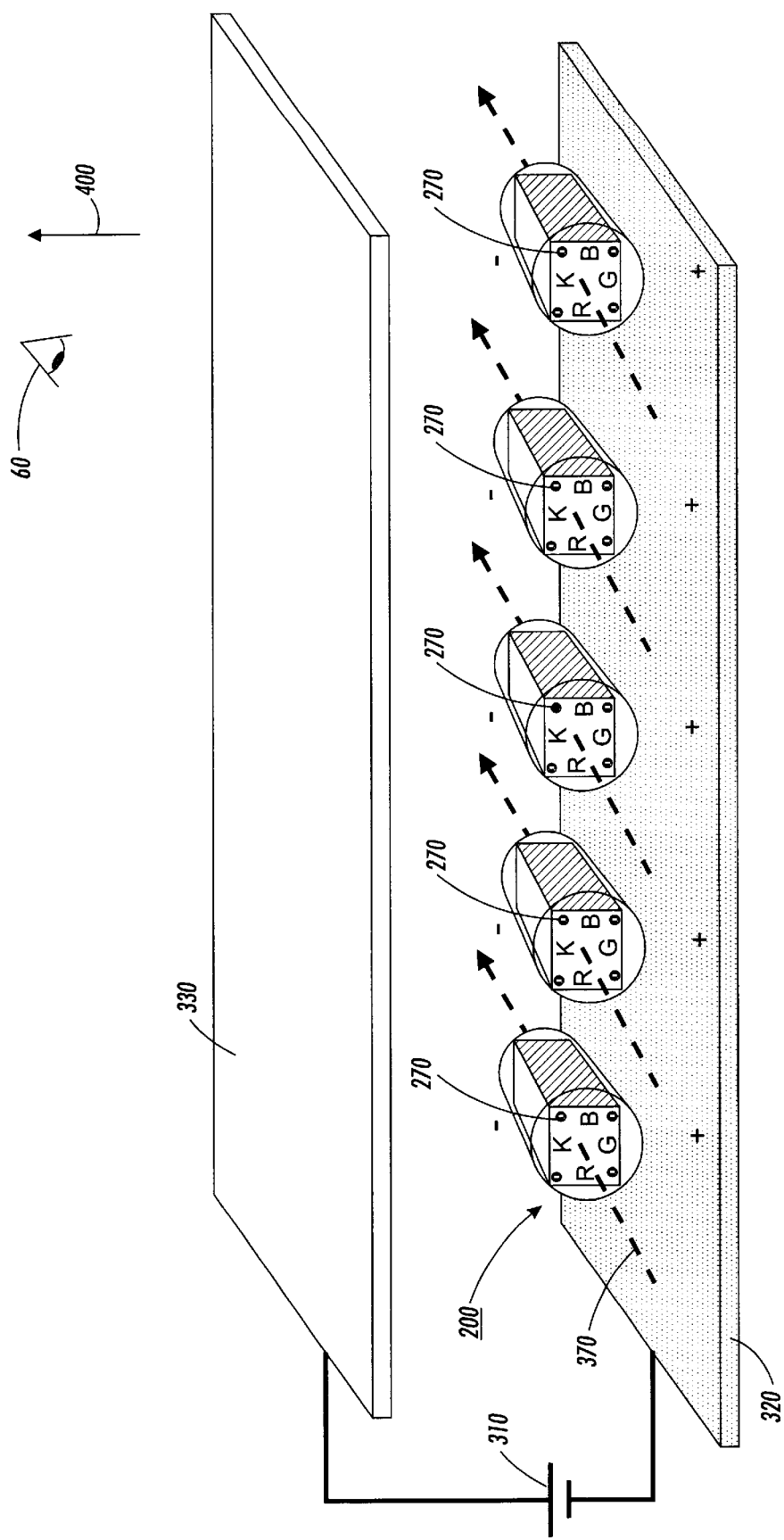
FIG. 26 depicts a plurality of rotatable elements from FIGS. 23 and 24 under the influence of an addressing vector field consistent with the present invention.

FIG. 26 depicts a plurality of rotatable elements 200 from FIGS. 23 and 24 under the influence of a vector field when the switch of FIG. 25 is closed. Substrate 40, enabling fluid 20, and sheet latching component 274 from FIG. 25 are not depicted in FIG. 26 simply for ease of illustration. However, one skilled in the art should appreciate that sheet latching component 274 is proximal to first rotatable latching component 270 (depicted in FIG. 26) and will function to "lock" rotatable element 200 in place in any of four orientations in the absence of an external field. In FIG. 26, the aspect temporarily locked into place is that where first aspect surface 242 (denoted by "K") may be viewed by favorably situated observer 60. In FIG. 26, with the switch associated with power source 310 closed, first overlay 330 has a net positive charge, and second overlay 320 has a net negative charge. Furthermore, parity vector 370 is directed towards the back of the figure. Finally, observer vector 400 is a vector associated with the direction of favorably situated observer 60 from the substrate.

V.D. A kit and Method for Addressing Rotating Element Sheet Material

Figure 27:
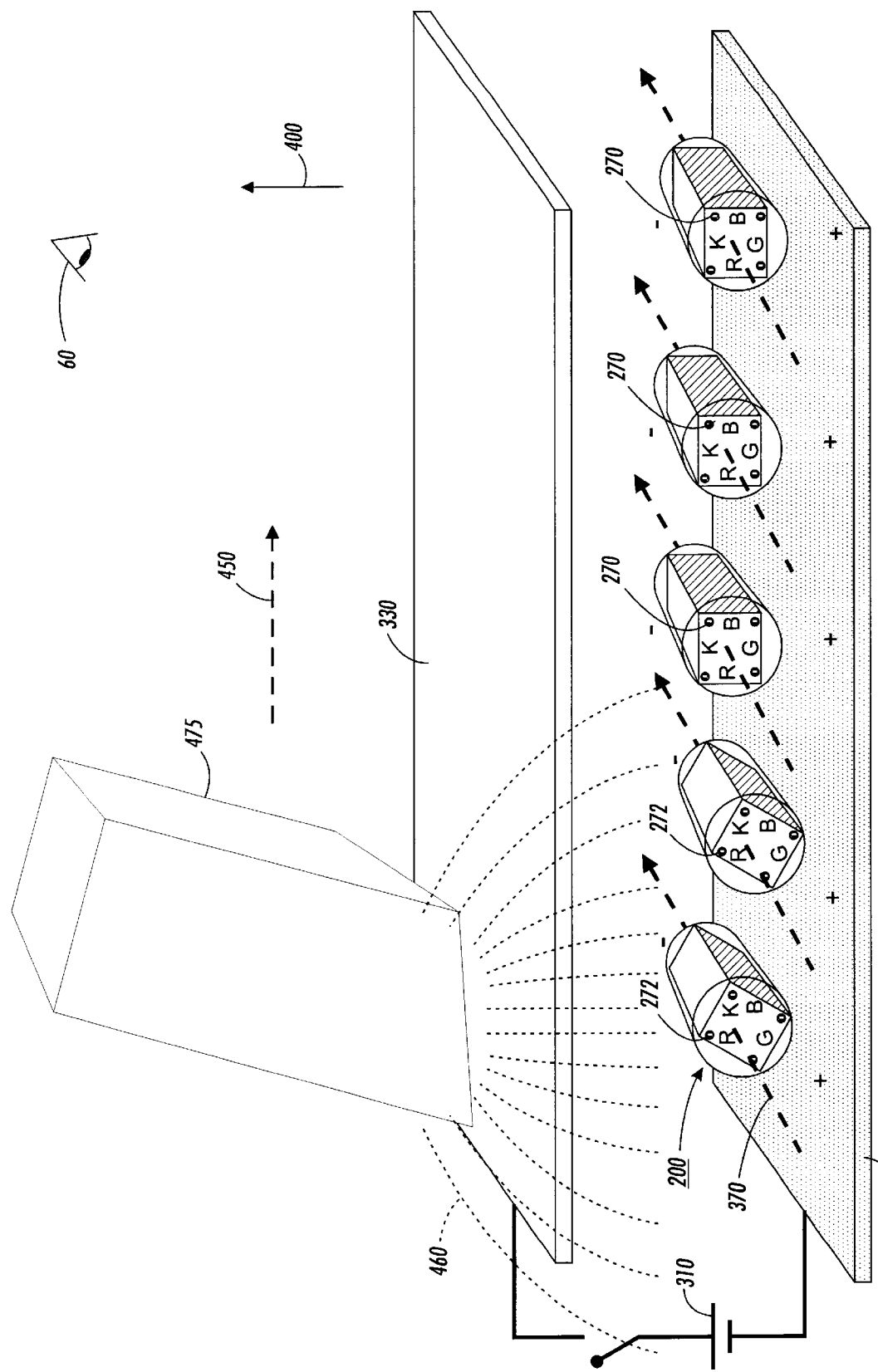
FIG. 27 depicts a gradient field stylus consistent with the present invention brought proximal to the rotatable elements of FIG. 26 in the absence of the addressing vector field.
Figure 28:
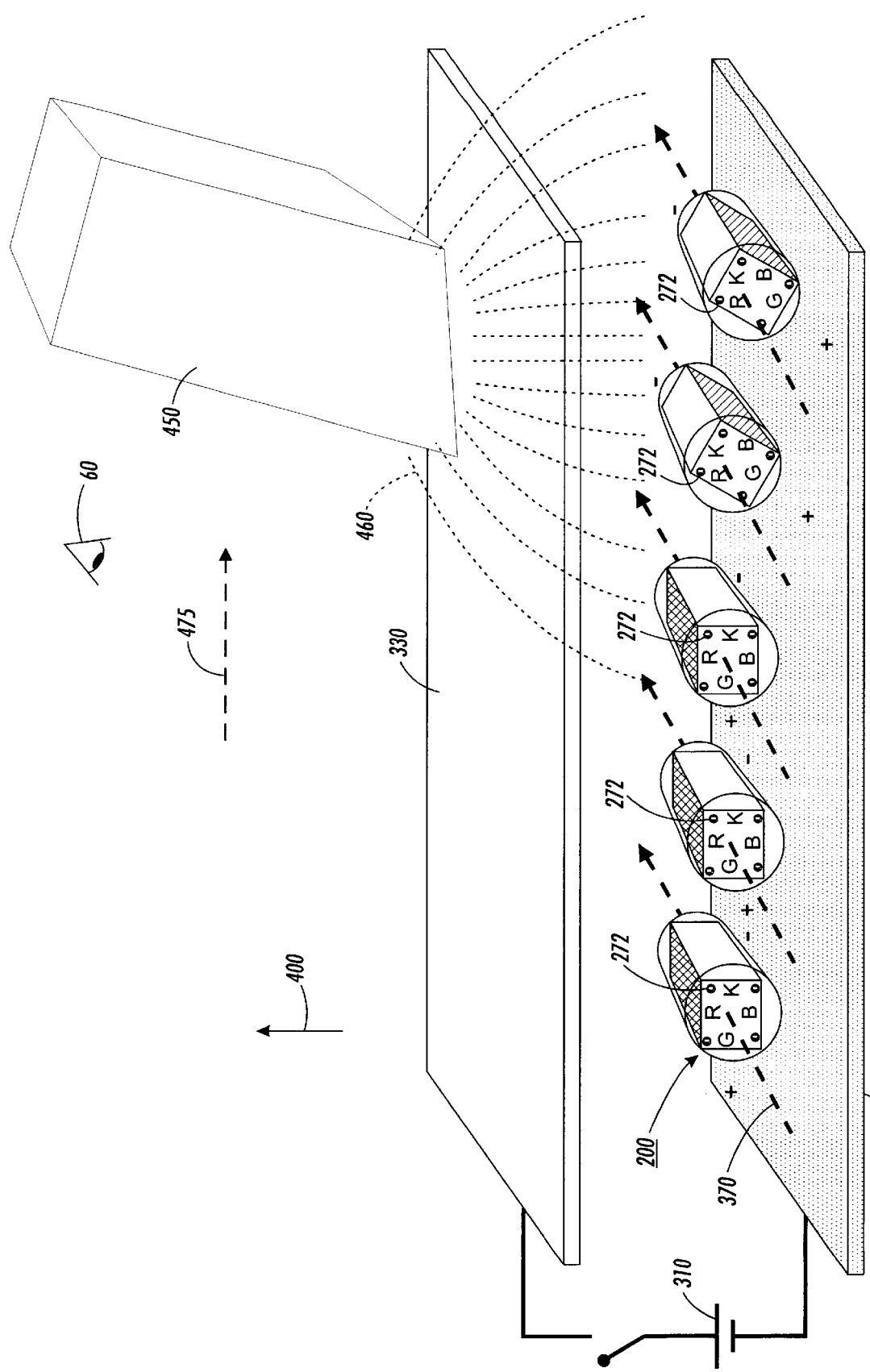
FIG. 28 depicts the kit of FIG. 27 after the gradient field stylus has moved perpendicular to the axis of rotation of the rotatable elements.

A kit and method for addressing rotating element sheet material of the present invention is depicted in FIGS. 27 and 28. FIG. 27 depicts rotating element sheet material 280 of FIGS. 25 and 26 with the switch associated with power source 310 in an open position. Accordingly, after the application of the vector field depicted in FIG. 26, all of the rotatable elements 200 display the same aspect to favorably situated observer 60. FIG. 27 depicts the introduction of gradient field stylus 475. In a preferred embodiment of the present invention, gradient field stylus 475 is configured such that magnetic field 460 is provided from the distal portion of gradient field stylus 475 nearest rotating element sheet material 280. Magnetic field 460 is depicted in FIG. 27 as a plurality of dashed lines in a localized region. Gradient field stylus 475 is in motion in the direction of velocity vector 450. Accordingly, one skilled in the art will appreciate that one of a plurality of rotatable elements 200 in the path of gradient field stylus 475 will first interact with magnetic field 460 associated with the leading edge of gradient field stylus. Since rotatable element 200 comprises rotatable latching elements configured to couple with an external magnetic field, the rotatable latching element nearest the distal end of gradient field stylus 475 will be the first to experience an attractive force greater than the attractive force between any of the rotatable latching components and the sheet latching components. Accordingly, from the configuration depicted in FIG. 27, such a rotatable latching component is second rotatable latching component 272. Accordingly, as gradient field stylus 475 moves over rotatable element 200, rotatable latching component 272 will couple the strongest with magnetic field 460, and will follow the distal end of gradient field stylus 475. This continues as gradient field stylus moves away from rotatable element 200 and as depicted in FIG. 28. Again, since the gradient field is localized, as the magnitude of the field diminishes, second rotatable component 272 will find itself proximal to sheet latching component 274, and rotatable element 200 will "lock" into a new orientation. For the rotatable elements depicted in FIGS. 27 and 28, this will be a 90-degree rotation into a "R" aspect, or red aspect.

Figure 29:
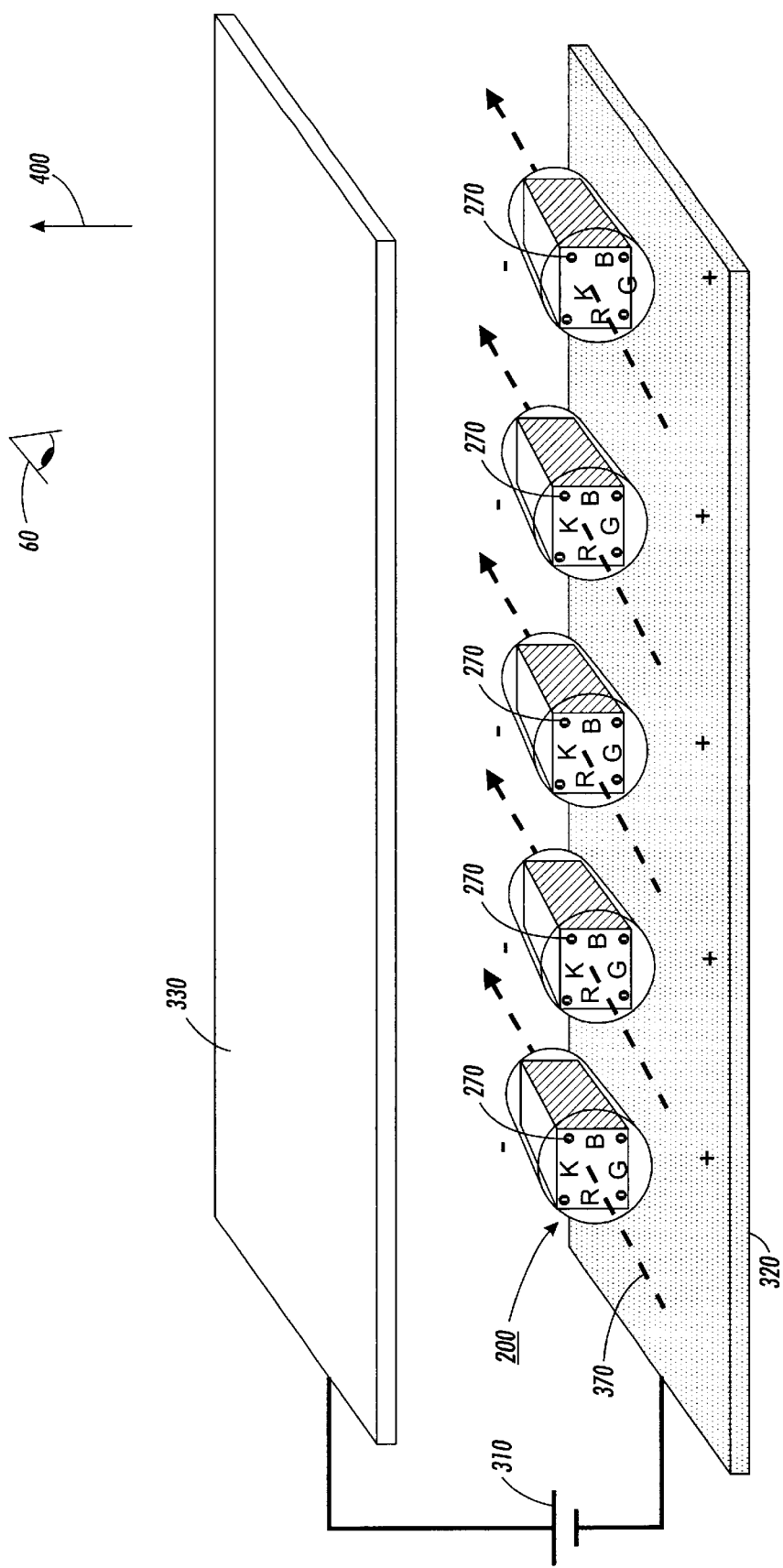
FIG. 29 depicts the plurality of rotatable elements of FIG. 28 under the influence of the addressing vector field in order to re-orient the rotatable elements.

After gradient field stylus 475 has been used to change the aspect, the rotatable elements 200 will maintain their new orientations due to the work function associated with aspect stability as well as due to the attraction between the rotatable latching components and the sheet latching components. In order to cause all of the rotatable elements to resume their initial state, for example, with all of the rotatable elements exhibiting first aspect surface 242 to a favorable situated observer, the switch associated with power source 310 may be closed, as depicted in FIG. 29.

Figure 30:
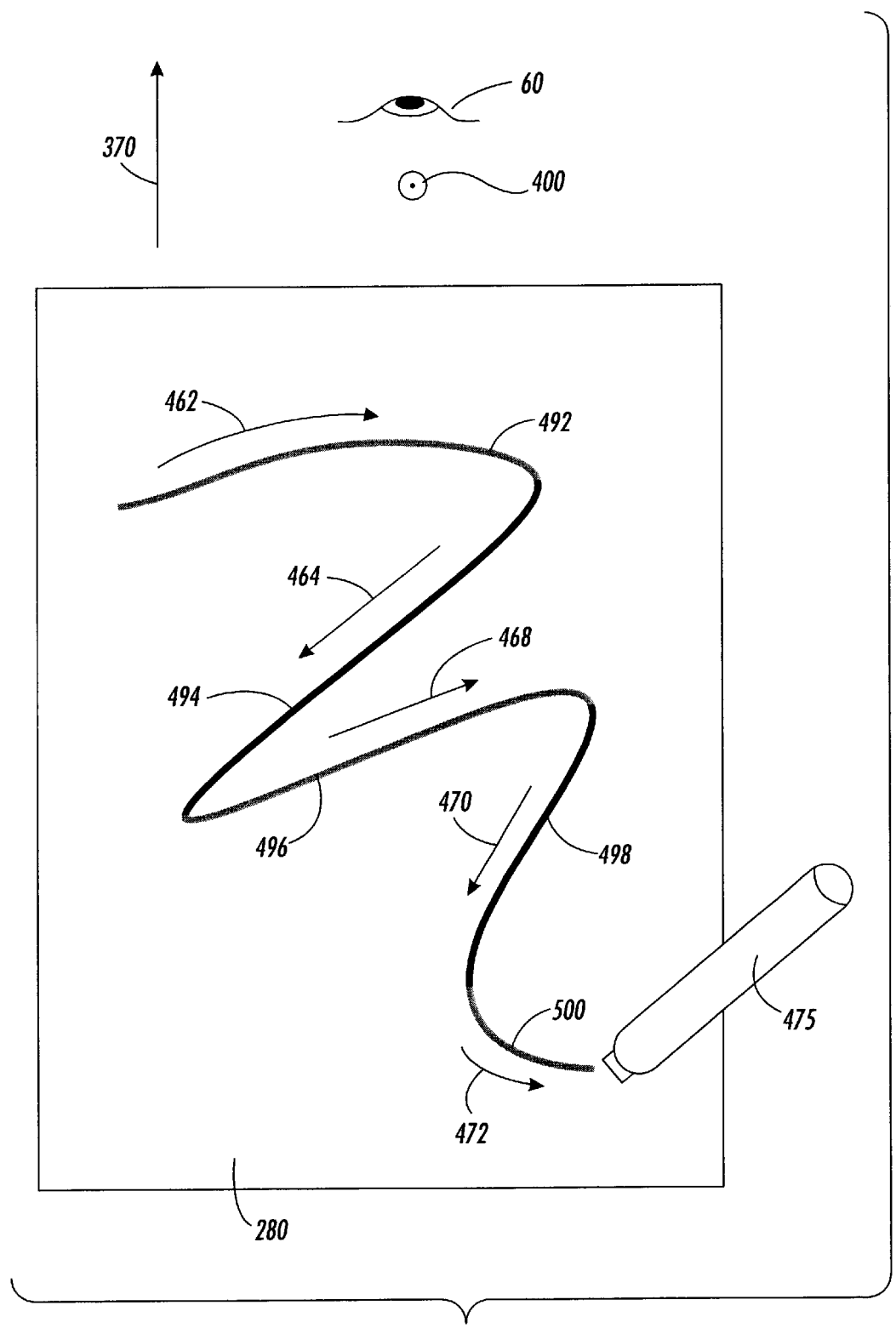
FIG. 30 depicts a macroscopic view of the kit of the present invention after the gradient field stylus has been moved over the surface of the rotating element sheet material and in the absence of the addressing vector field.

One skilled in the art will also appreciate that gradient field stylus 475 in FIGS. 27 and 28 was depicted as in motion from the left to the right. However, gradient field stylus 475 may also be moved from the right to the left. Note, however, that such motion will cause the rotatable elements in the path of gradient field stylus to lock into an orientation where fourth aspect surface 248 (the "B" or blue surface) will be exhibited to favorably situated observer 60. Such motion is depicted in FIG. 30, where gradient field stylus 475 is caused to sweep out the path comprising segment 492, segment 494, segment 496, segment 498, and segment 500. The corresponding velocity vector associated with each of the segments is also depicted in FIG. 30 alongside the respective segment. The velocity vectors depicted in FIG. 30 comprise velocity vector 462, velocity vector 464, velocity vector 466, velocity vector 468, velocity vector 470, and velocity vector 472. Also shown in FIG. 30 is parity vector 370 associated with all of the rotatable elements in rotating element sheet material 280, and observer vector 400 directed out of the plane of the figure. Accordingly, the aspect that is observed by favorably situated observer alternates between that aspect associated with second aspect surface 244 and fourth aspect surface 248. This is depicted in FIG. 30 by the choice of difference shading for the difference segments of the path of gradient field stylus 475.

VI. CONCLUSION

Methods and apparatus consistent with the present invention can be used to address rotating element sheet material with a gradient field stylus. The foregoing description of an implementation of the invention has been presented for purposes of illustration and description. It is not exhaustive and does not limit the invention to the precise form disclosed. Modifications and variations are possible in light of the above teachings or may be acquired from practicing the invention. For example, some of the examples used the spectrum associated with visible light as the electromagnetic energy of interest. However, the use of any electromagnetic energy, including infrared, ultraviolet and x-rays as the electromagnetic energy of interest is consistent with the present invention. Still further, FIGS. 23–30 depict composite rotatable-elements with four aspects. However, the rotatable-elements may exhibit any number of aspects. Furthermore, the aspects associated with different sides of a prismatically shaped core may be chosen not to be distinguishable. Further still, the rotatable elements of the present invention were described as comprising aspect-transparent cladding. However, one skilled in the art should appreciate that the rotatable elements of the present invention may also be fabricated without aspect-transparent cladding. Accordingly, the rotatable elements may simply comprise, for example, a substantially cylindrical core with a suitable choice of coatings or material in order to present any number of aspects to a favorably situated observer and to exhibit the appropriate addressing polarity. Accordingly, one skilled in the art should appreciate that by a suitable construction of rotatable elements with rotatable latching components, any of the multiaspect surfaces may be oriented towards a favorably situated observer. Accordingly, the invention is not limited to the above described embodiments, but instead is defined by the appended claims in light of their full scope of equivalents.

What is claimed is:

1. A kit comprising:
    rotating element sheet material; and
    a gradient field stylus;
    where the rotating element sheet material comprises:
        a plurality of rotatable elements disposed in a substrate and in contact with an enabling fluid;
        where the substrate comprises a plurality of sheet latching components;
        where at least one of the plurality of rotatable elements comprises:
            (i) a core configured to present a first aspect in a first orientation and a second aspect in a second orientation; and
            (ii) at least a first rotatable latching component and a second rotatable latching component;
        where the first orientation and the second orientation are related by a rotational transformation about an axis of the rotatable element; and
        where at least one of the plurality of sheet latching components is proximal to the first rotatable latching component in the first orientation;
        where the sheet latching component is proximal to the second rotatable latching component in the second orientation;
        where the rotatable latching components and the sheet latching component are configured to exhibit an attractive force when proximal based on a first gradient field; and
    where a distal end of the gradient field stylus is configured to exhibit an attractive force with the rotatable latching components when proximal based on a second gradient field.

2. The kit of claim 1,
    where said rotatable element further comprises:
        aspect-transparent cladding configured to coat said core.

3. The kit of claim 1,
    where the first rotatable latching component and the second rotatable latching component are mutually spaced from one another along the axis of the rotatable element and from any other rotatable latching component within the rotatable element.

4. The kit of claim 1,
    where the rotatable element in contact with the enabling fluid is further configured to exhibit an addressing dipole configured to respond to a vector field; and
    where the addressing dipole is configured such that the rotatable element exhibits the first aspect under the influence of the vector field in a first direction.

5. The kit of claim 1,
    where said first gradient field is a first magnetic field; and
    where said second gradient field is a second magnetic field.

6. The kit of claim 5,
    where said first rotatable latching component comprises ferromagnetic material; and
    where said second rotatable latching component comprises ferromagnetic material.

7. The kit of claim 5,
    where said sheet latching component comprises paramagnetic material.

8. The kit of claim 5,
    where said sheet latching component comprises superparamagnetic material.

9. The kit of claim 5,
    where said first aspect is a first response to incident electromagnetic waves in the range of visible wavelengths; and
    where said second aspect is a second response to incident electromagnetic waves in the range of visible wavelengths.

10. A method of addressing rotating element sheet material comprising:
    providing the rotating element sheet material; and
    providing a gradient field stylus;
    where the rotating element sheet material comprises:
        a plurality of rotatable elements disposed in a substrate and in contact with an enabling fluid;
        where the substrate comprises a plurality of sheet latching components;
        where at least one of the plurality of rotatable elements comprises:

(i) a core configured to present a first aspect in a first orientation and a second aspect in a second orientation; and (ii) at least a first rotatable latching component and a second rotatable latching component;

where the first orientation and the second orientation are related by a rotational transformation about an axis of the rotatable element; and where at least one of the plurality of sheet latching components is proximal to the first rotatable latching component in the first orientation;

where the sheet latching component is proximal to the second rotatable latching component in the second orientation;

where the rotatable latching components and the sheet latching component are configured to exhibit an attractive force when proximal based on a first gradient field; and where a distal end of the gradient field stylus is configured to exhibit an attractive force with the rotatable latching components when proximal based on a second gradient field; and moving the gradient field stylus across the substrate such that:

(i) the attractive force between the second rotatable latching component and the distal end of the gradient field stylus is first less than the attractive force between the first rotatable latching component and the sheet latching component;

(ii) the attractive force between the second rotatable latching component and the distal end of the gradient field stylus is next greater than the attractive force between the first rotatable latching component and the sheet latching component; and (iii) the attractive force between the second rotatable latching component and the distal end of the gradient field stylus is next less than the attractive force between the second rotatable latching component and the sheet latching component.

11. The method of addressing rotating element sheet material of claim 10, where said first gradient field is a first magnetic field; and where said second gradient field is a second magnetic field.

12. The method of claim 11, where said first rotatable latching component comprises ferromagnetic material; and where said second rotatable latching component comprises ferromagnetic material.

13. The method of claim 11, where said sheet latching component comprises paramagnetic material.

14. The method of claim 11, where said sheet latching component comprises superparamagnetic material.

15. The method of claim 11, where said first aspect is a first response to incident electromagnetic waves in the range of visible wavelengths; and where said second aspect is a second response to incident electromagnetic waves in the range of visible wavelengths.

* * * * *